US005548071A

United States Patent [19]

Deitz et al.

[11] Patent Number: 5,548,071

[45] Date of Patent: Aug. 20, 1996

[54] FIBER-REACTIVE TRIAZINE DYES WITH ONE AZO CHROMOPHORE HAVING A VINYLSULFONYL TYPE REACTIVE RADICAL AND A SECOND CHROMOPHORE

[75] Inventors: Rolf Deitz, Basle; Athanassios Tzikas, Pratteln; Paul Herzig, Basle, all of Switzerland

[73] Assignee: Ciba-Geigy Corporation, Tarrytown, N.Y.

[21] Appl. No.: 242,562

[22] Filed: May 13, 1994

[30] Foreign Application Priority Data

| | | | |
|---|---|---|---|
| May 17, 1993 | [CH] | Switzerland | 1493/93 |
| Sep. 1, 1993 | [CH] | Switzerland | 2598/93 |

[51] Int. Cl.[6] .......... C09B 62/503; C09B 62/04; D06P 1/38

[52] U.S. Cl. .......... 534/612; 534/617; 534/618; 534/622; 534/625; 534/632; 534/635; 534/636; 534/637; 534/638; 8/547; 8/549

[58] Field of Search .......... 534/617, 612, 534/618, 632–638; 544/76, 189; 540/126

[56] References Cited

U.S. PATENT DOCUMENTS

| | | | |
|---|---|---|---|
| 3,223,470 | 12/1965 | Boedeker | 8/549 |
| 4,242,258 | 12/1980 | Noll et al. | 534/637 |
| 4,806,127 | 2/1989 | Schläfer | 8/549 |
| 4,916,215 | 4/1990 | Hoyer | 534/636 |
| 5,122,605 | 6/1992 | Pedrazzi | 534/618 X |
| 5,200,511 | 4/1993 | Loeffler | 534/634 |
| 5,232,462 | 8/1993 | Tzikas | 8/549 |
| 5,278,293 | 1/1994 | Heid | 534/643 |
| 5,420,257 | 5/1995 | Anderton et al. | 534/617 X |
| 5,434,251 | 7/1995 | Herd | 534/637 X |

FOREIGN PATENT DOCUMENTS

| | | |
|---|---|---|
| 0094019 | 11/1983 | European Pat. Off. . |
| 0258806 | 3/1988 | European Pat. Off. . |
| 0432542 | 6/1991 | European Pat. Off. . |
| 0478503 | 4/1992 | European Pat. Off. . |
| 0568816 | 11/1993 | European Pat. Off. . |

OTHER PUBLICATIONS

Herd, Chemical Abstracts, 120:194034 a (1994).

*Primary Examiner*—Fiona T. Powers
*Attorney, Agent, or Firm*—Kevin T. Mansfield

[57] ABSTRACT

The invention relates to compounds of the formula

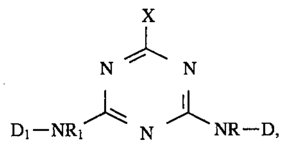

(1)

where the variables are each as defined in the claims. The compounds are suitable for use as dyes, in particular for dyeing and printing cellulose-containing fibre materials and produce dyeings and prints having good allround fastness properties.

17 Claims, No Drawings

FIBER-REACTIVE TRIAZINE DYES WITH ONE AZO CHROMOPHORE HAVING A VINYLSULFONYL TYPE REACTIVE RADICAL AND A SECOND CHROMOPHORE

The present invention relates to novel fibre-reactive dyes which are suitable for dyeing cellulose-containing fibre materials from an aqueous bath and for printing cellulose-containing fibre materials.

The present invention provides compounds of the formula

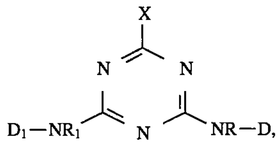

(1)

where

D is the radical of a monoazo, polyazo, metal complex azo, anthraquinone, triphendioxazine, phthalocyanine or formazan chromophore that contains at least one sulfo group, $D_1$ is the radical of a monoazo chromophore of the formula

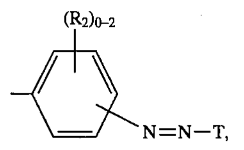

(1*)

where $(R_2)_{0-2}$ represents 0 to 2 identical or different radicals $R_2$ selected from the group consisting of sulfo, sulfomethyl, hydroxyl, carboxyl, halogen, cyano, trifluoromethyl, sulfamoyl, carbamoyl, $C_2$–$C_4$alkanoylamino, ureido, $C_1$–$C_4$alkyl, $C_1$–$C_4$alkoxy, or $C_1$–$C_4$alkoxy substituted by $C_1$–$C_4$alkoxy, hydroxyl or sulfato in the alkyl moiety, and T is the radical of a diazo component or coupling component of the benzene or naphthalene series or of the heterocyclic series, or is the radical of a polyazo, metal complex azo, anthraquinone, triphenedioxazine, phthalocyanine or formazan chromophore, and at least one of the radicals D and $D_1$ contains a fibre-reactive radical —$SO_2$—Y, Y is vinyl or a radical —$CH_2$—$CH_2$—U and U is a leaving group, X is fluorine, chlorine, bromine, 3-carboxy-1-pyridinyl or 3-carbamoyl-1-pyridinyl, and R and $R_1$ are each independently of the other hydrogen or unsubstituted or halogen-, hydroxyl-, cyano-, $C_1$–$C_4$alkoxy-, $C_1$–$C_4$alkoxycarbonyl-, carboxyl-, sulfo- or sulfato-substituted $C_1$–$C_4$alkyl, with the proviso that the radical —NR— is not bonded to an $NH_2$-substituted phenylene radical when D is the radical of a monoazo or disazo chromophore.

Alkoxy generally means methyl, ethyl, n-propyl, isopropyl, n-butyl, isobutyl, sec-butyl or tert-butyl; $C_1$–$C_4$alkoxy generally encompasses methoxy, ethoxy, n-propoxy, isopropoxy, n-butoxy, isobutoxy, sec-butoxy or tert-butoxy; halogen is generally for example fluorine, bromine or in particular chlorine; $C_1$–$C_4$alkoxycarbonyl generally means methoxycarbonyl, ethoxycarbonyl, n-propoxycarbonyl, isopropoxycarbonyl, n-butoxycarbonyl, isobutoxycarbonyl, sec-butoxycarbonyl or tert-butoxycarbonyl, preferably methoxycarbonyl or ethoxycarbonyl. Examples of $C_1$–$C_4$alkylsulfonyl include methylsulfonyl and ethylsulfonyl, examples of N-mono- or N,N-di-$C_1$–$C_4$alkylcarbamoyl include N-methylcarbamoyl, N-ethylcarbamoyl, N,N-dimethylcarbamoyl or N,N-diethylcarbamoyl, and examples of N-mono- or N,N-di-$C_1$–$C_4$alkylsulfamoyl include N-methylsulfamoyl, N-ethylsulfamoyl, N-propylsulfamoyl, N-isopropylsulfamoyl, N-butylsulfamoyl, N-β-hydroxyethylsulfamoyl, N,N-di-β-hydroxyethylsulfamoyl, N,N-dimethylsulfamoyl or N,N-diethylsulfamoyl. Examples of $C_2$–$C_4$alkanoylamino include acetylamino and propionylamino. Examples of $C_1$–$C_4$alkoxy substituted in the alkyl moiety include 2-hydroxyethoxy, 3-hydroxypropoxy, 2-sulfatoethoxy, 2-methoxyethoxy and 2-ethoxyethoxy.

Examples of suitable radical R and $R_1$ include hydrogen, unsubstituted $C_1$–$C_4$alkyl, carboxymethyl, β-carboxyethyl, β-carboxypropyl, methoxycarbonylmethyl, ethoxycarbylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl and β-sulfatoethyl.

R and $R_1$are each independently of the other preferably methyl, ethyl or in particular hydrogen.

X is preferably fluorine or in particular chlorine.

Suitable leaving groups U include for example halogen, e.g. chlorine, acyloxy, e.g. acetoxy or phenoxy, phosphato, sulfato and thiosulfato.

Examples of suitable radicals Y include accordingly vinyl, β-bromoethyl, β-chloroethyl, β-acetoxyethyl, β-phenoxyethyl, β-phosphatoethyl, β-sulfatoethyl and β-thiosulfatoethyl. Y is preferably vinyl or β-sulfatoethyl.

The chromophore radicals D and $D_1$ may each contain independently of each other the customary organic dye substituents attached to their basic structure.

Examples of such further substituents on the chromophores include $C_1$–$C_4$alkyl, $C_1$–$C_4$alkoxy, $C_1$–$C_4$alkoxy substituted for example by hydroxyl, $C_1$–$C_4$alkoxy or sulfato in the alkyl moiety, e.g. 2-hydroxyethoxy, 3-hydroxypropoxy, 2-sulfatoethoxy, 2-methoxyethoxy, 2-ethoxyethoxy, acylamino groups having 1 to 8 carbon atoms, in particular alkanoylamino groups and alkoxycarbonylamino groups, such as acetylamino, propionylamino, methoxycarbonylamino, ethoxycarbonylamino or benzoylamino, phenylamino, amino, N-mono- or N,N-di-$C_1$–$C_4$alkylamino, N,N,-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen such as fluorine, chlorine or bromine, carbamoyl, N-alkylcarbamoyl having 1 to 4 carbon atoms in the alkyl radical such as N-methylcarbamoyl, or N-ethylcarbamoyl, sulfamoyl, N-alkylsulfamoyl having 1 to 4 carbon atoms such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di(β-hydroxyethyl)sulfamoyl, N-phenylsulfamoyl, ureido, hydroxyl, carboxyl, sulfomethyl or sulfo. The reactive dyes contain at least one and preferably at least two sulfonic acid groups.

A fibre-reactive radical —$SO_2$—Z present in D or $D_1$ can be attached to the chromophore directly or via a bridge member.

Preferably D and/or $D_1$ contains as the fibre-reactive radical a radical of the formula $$-SO_2-Y \quad (2a)$$

$$-CONH-(CH_2)_n-SO_2-Y \quad (2b)$$

$$-CONH-(CH_2)_{n'}-O-(CH_2)_n-SO_2-Y \quad (2c)$$

or $$-(O)_p-(CH_2)_m-CONH-(CH_2)_n-SO_2-Y, \quad (2d)$$

where n,n' and m are each independently of the others an integer from 1 to 6, p is 0 or 1, and Y is an defined above.

n and n' are each preferably independently of the other 2, 3 or 4, particularly preferably 2 or 3, and very particularly preferably 2.

m is preferably 1, 2 or 3 and particularly preferably 1 or 2.

p is preferably 0.

Of particular interest are compounds of the formula (1) where D and/or $D_1$ contains one or more fibre-reactive radicals of the formula $$-SO_2-Y, \quad (2a)$$

$$-CONH-(CH_2)_{2-4}-SO_2-Y \quad (2b')$$

or $$-(CH_2)_{1-3}-CONH-(CH_2)_{2-4}-SO_2-Y \quad (2d')$$

where Y is vinyl, β-bromoethyl, β-chloroethyl, β-acetoxyethyl, β-phenoxyethyl, β-phosphatoethyl, β-sulfatoethyl or β-thiosulfatoethyl.

Particularly preferably D and/or $D_1$ carry one or more fibre-reactive radicals of the formula $$-SO_2-Y \quad (2a)$$

and $$-CONH-(CH_2)_{2-3}-SO_2-Y, \quad (2b'')$$

where Y is vinyl or β-sulfatoethyl. Here it is particularly preferable for only one of the radicals D and $D_1$ to contain a fibre-reactive radical and for this fibre-reactive radical to conform to the above-indicated formula (2a) or 2b").

$(R_2)_{0-2}$ preferably represents 0 to 2 radicals $R_2$ selected from the group consisting of sulfo, $C_2$–$C_4$alkanoylamino, ureido, $C_1$–$C_4$alkyl, $C_1$–$C_4$alkoxy, 2-hydroxyethoxy, 2-sulfatoethoxy, 2-methoxyethoxy and 2-ethoxyethoxy. Particularly preferably $(R_2)_{0-2}$ represents 0 to 2 radicals $R_2$selected from the group consisting of sulfo, acetylamino, propionylamino, ureido, methyl, methoxy, 2-hydroxyethoxy and 2-sulfatoethoxy.

A radical T of a coupling component is for example a suitably substituted phenyl, naphthyl, 6-hydroxy-2-pyridone or 1-phenyl- or 1 -naphthyl-5-pyrazolone radical. A coupling component radical T is unsubstituted or for example $C_1$–$C_2$alkyl-, $C_1$–$C_2$alkoxy-, halogen-, carboxyl-, sulfo-, hydroxyl-, amino-, N-mono-$C_1$–$C_4$alkylamino-, N,N-di-$C_1$–$C_4$alkylamino-, $C_2$–$C_4$alkanoylamino- or benzoylamino-substituted phenyl or naphthyl or a radical of the formula

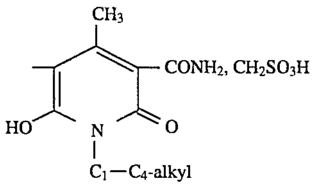

(3)

or

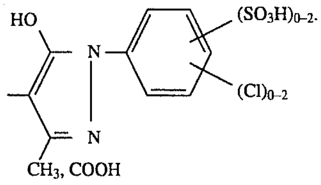

(3')

A radical T of a coupling component is particularly preferably an unsubstituted or methyl-, methoxy-, chlorine-, sulfo-, hydroxyl-, amino-, acetylamino- or benzoylamino-substituted phenyl or naphthyl radical or a radical of the above-indicated formula (3).

A radical T of a diazo component is for example an unsubstituted phenyl or naphthyl radical or a phenyl or naphthyl radical substituted for example by $C_1$–$C_2$alkyl, $C_1$–$C_2$alkoxy, carboxyl, sulfo, halogen or by a radical of the previously indicated formula (2a) to 2d). A radical T of a diazo component is preferably an unsubstituted phenyl or naphthyl radical or a phenyl or naphthyl radical substituted by sulfo, methyl, methoxy, chlorine or a radical of the formula (2a) or 2b").

Preferred meanings of D concern:

a) Dye radicals of a 1:1 copper complex azo dye of the benzene or naphthalene series wherein the copper atom is bonded at each end to a metallizable group in the ortho position relative to the azo bridge.

b) Dye radicals of a monoazo or disazo dye, of the formula $$D^*-N=N-(M-N=N)_u-K-, \quad (3a)$$

$$-D^*-N=N-(M-N=N)_u-K \quad (3b)$$

or $$-D^*-N=N-(M-N=N)_u-K-, \quad (3c)$$

or of a metal complex derived therefrom; D* is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetoacetarylamide series, and D*, M and K can carry substituents customary in azo dyes, in particular hydroxyl, amino, methyl, ethyl, methoxy or ethoxy groups, 2-hydroxyethoxy, 2-methoxyethoxy or 2-sulfatoethoxy groups, substituted or unsubstituted alkanoylamino groups having 2 to 4 carbon atoms, substituted or unsubstituted benzoylamino groups, halogen atoms and also, in the case of $D_1$, one or more fibre-reactive radicals of the previously indicated formula (2a), 2b), (2c) or (2d); u is 0 or 1; and D*, M and K together contain at least two sulfo groups, preferably three or four sulfo groups.

c) Dye radicals of a disazo dye, of the formula $$-D^*-N=N-K_1-N=N-D_1^* \quad (4a)$$

or $$-D^*-N=N-K_1-N=N-D_1^*-, \quad (4b)$$

in which D* and $D_1$* are independently of each other the radical of a diazo component of the benzene or naphthalene series and $K_1$ is the radical of a coupling component of the naphthalene series, and D*, $D_1$* and $K_1$ can carry substituents customary in azo dyes, in particular hydroxyl, amino, methyl, ethyl, methoxy or ethoxy groups, substituted or unsubstituted alkanoylamino groups having 2 to 4 carbon atoms, 2-hydroxyethoxy, 2-methoxyethoxy or 2-sulfatoethoxy groups, substituted or unsubstituted benzoylamino groups, halogen atoms and also, in the case of $D_1$, one or more fibre-reactive radicals of the previously indicated formula (2a), (2b), (2c) or (2d), and D*, $D_1$* and $K_1$ together contain at last two sulfo groups, preferably three or four sulfo groups.

d) Dye radicals of a formazan dye, of the formula (5a)

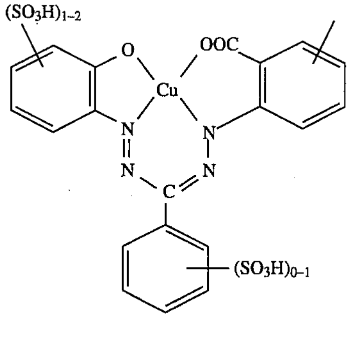

or (5b)

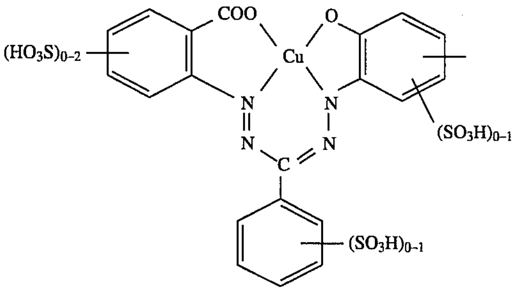

(5c)

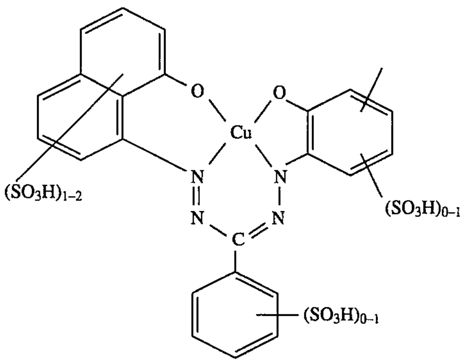

or (5d)

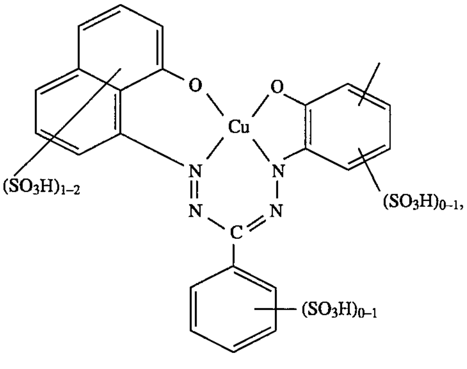

in which the benzene nuclei may be further substituted by alkyl having 1 to 4 carbon atoms, alkoxy having 1 to 4 carbon atoms, alkylsulfonyl having 1 to 4 carbon atoms, halogen carboxyl and also, in the case of $D_1$, by one or more fibre-reactive radicals of the previously indicated formula (2a), (2b), (2c) or (2d).

e) Dye radicals of an anthraquinone dye, of the formula (6)

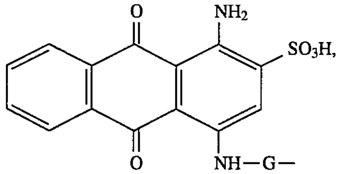

in which G is a phenylene, cyclohexylene, phenylenemethylene or $C_2$–$C_6$alkylene radical, and the anthraquinone nucleus may be substituted by a further sulfo group, and G as phenyl radical may be substituted by alkyl having 1 to 4 carbon atoms, alkoxy having 1 to 4 carbon atoms, halogen, carboxyl or sulfo, and the dye preferably contains at least 2 sulfo groups.

f) Dye radicals of a phthalocyanine dye, of the formula (7)

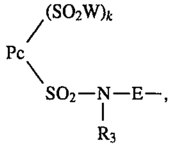

in which Pc is the radical of a copper or nickel phthalocyanine; W is —OH and/or —$NR_4R_5$; $R_4$ and $R_5$ are each independently of the other hydrogen or alkyl having 1 to 4 carbon atoms, which may be substituted by hydroxyl or sulfo; $R_3$ is hydrogen or alkyl having 1 to 4 carbon atoms; E is a phenylene radical which may be substituted by alkyl having 1 to 4 carbon atoms, halogen, carboxyl or sulfo; or is an alkylene radical having 2 to 6 carbon atoms, preferably a sulfophenylene or ethylene radical; and k is 1, 2 or 3.

g) Dye radicals of a dioxazine dye, of the formula (8a)

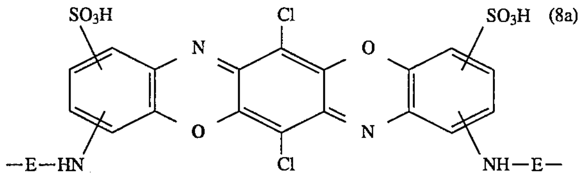

or (8b)

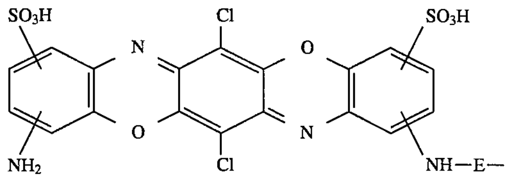

or (8c)

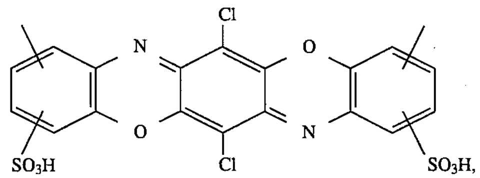

in which E is a phenylene radical which may be substituted by alkyl having 1 to 4 carbon atoms, halogen, carboxyl or sulfo; or is an alkylene radical having 2 to 6 carbon atoms; and the outer benzene rings in the formulae (8a), (8b) and (8c) may be further substituted by alkyl having 1 to 4 carbon atoms, alkoxy having 1 to 4 carbon atoms, acetylamino, nitro, halogen, carboxyl, sulfo and also, in the case of $D_1$ by one or more fibre-reactive radicals of the previously indicated formula (2a), (2b), (2c) or (2d).

Particularly important dye radicals D for the reactive dyes of the formula (1) according to the invention are the chromophore radicals of the following formulae (9) to (20):

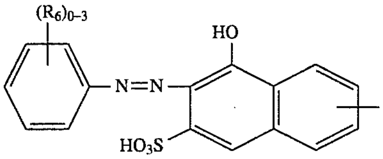
(9)

in which $R_6$ is $C_1$–$C_4$alkyl, $C_1$–$C_4$alkoxy, halogen, carboxyl or sulfo.

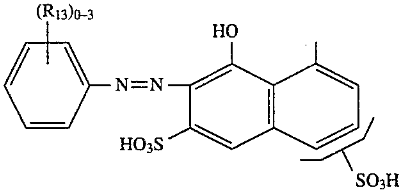
(10)

in which $R_{13}$ is $C_1$–$C_4$alkyl, $C_1$–$C_4$alkoxy, halogen, carboxyl, sulfo or $C_1$–$C_4$ alkoxyanilino.

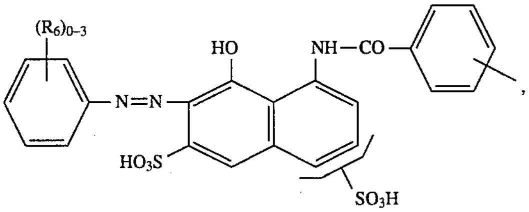
(11)

in which $R_6$ is $C_1$–$C_4$alkyl, $C_1$–$C_4$alkoxy, halogen, carboxyl or sulfo.

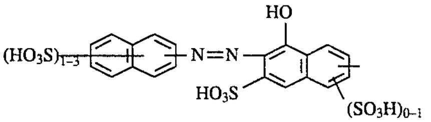
(12)

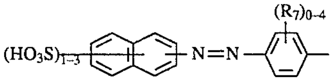
(13a)

or

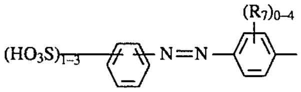
(13b)

or

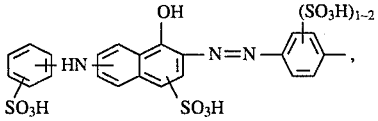
(13c)

in which $R_7$ is halogen, nitro, cyano, trifluoromethyl, sulfamoyl, carbamoyl, $C_1$–$C_4$alkyl, $C_1$–$C_4$alkoxy, acetylamino, ureido, hydroxyl, carboxyl, sulfomethyl or sulfo.

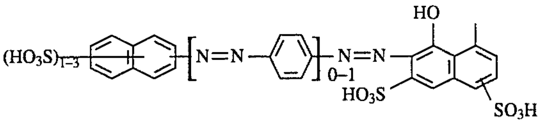
(14)

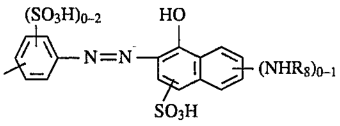
(15a)

or

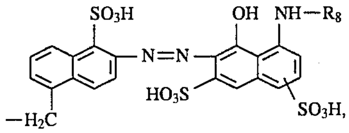
(15b)

in which $R_8$ is $C_1$–$C_4$alkanoyl or benzoyl.

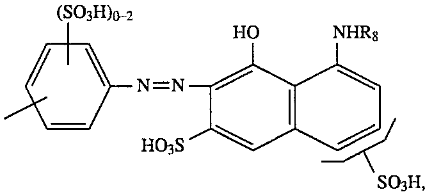
(16)

in which $R_8$ is $C_1$–$C_4$alkanoyl or benzoyl.

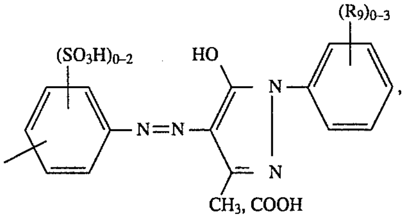
(17)

in which $R_9$ is $C_1$–$C_4$alkyl, $C_1$–$C_4$alkoxy, halogen, carboxyl or sulfo.

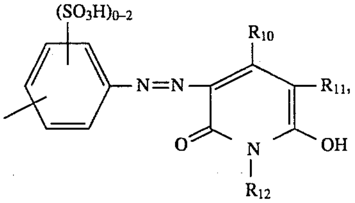
(18)

in which $R_{12}$ and $R_{10}$ are independently of each other hydrogen, $C_1$–$C_4$alkyl or phenyl, and $R_{11}$ is hydrogen, cyano, carbamoyl or sulfomethyl.

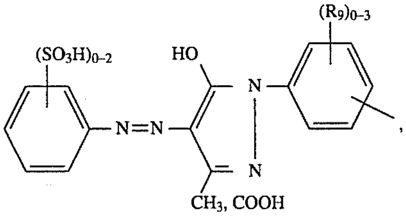
(19)

in which $R_9$ is $C_1$–$C_4$alkyl, $C_1$–$C_4$alkoxy, halogen, carboxyl or sulfo.

(19a)

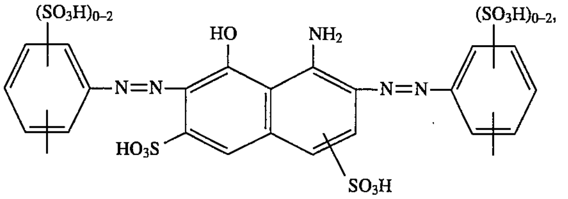

(20)

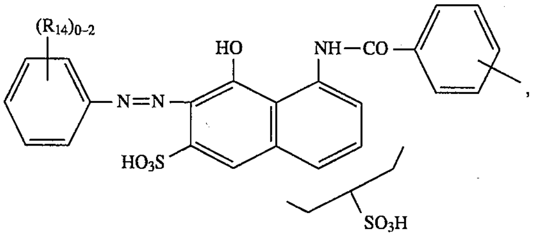

in which $R_{14}$ is $C_1$–$C_4$alkyl, $C_1$–$C_4$alkoxy, halogen, carboxyl or sulfo.

in which $R_6$ is as defined under formula (11).

(21)

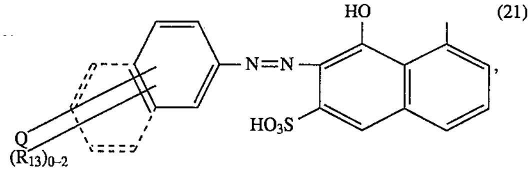

in which Q is a radical of the previously indicated formula (2a), (2b') or (2d') and $(R_{13})_{0-2}$ represents 0 to 2 identical or different radicals $R_{13}$ selected from the group consisting of methyl, methoxy, chlorine and sulfo.

(20a)

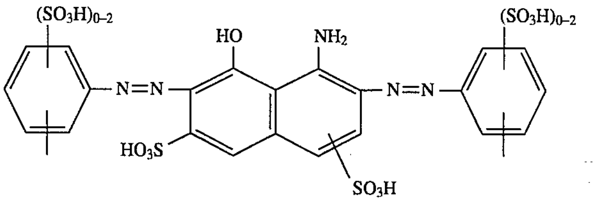

(20b)

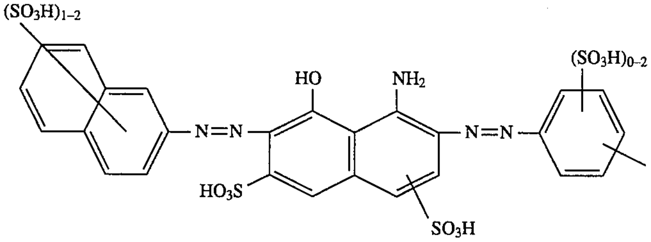

(20c)

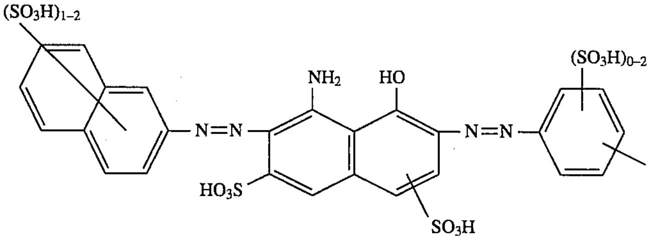

(20d)

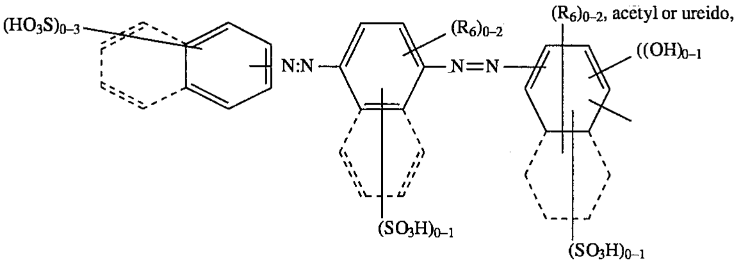

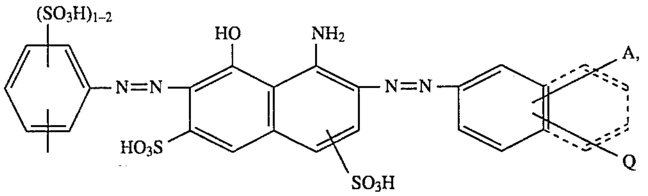

(22)

in which A is hydrogen, halogen, $C_1$–$C_4$alkyl, $C_1$–$C_4$alkoxy, sulfo, carboxyl, trifluoromethyl, nitro, cyano, hydroxyl, carbamoyl, N-mono- or N,N-di-$C_1$–$C_4$alkylcarbamoyl, sulfamoyl, N-mono- or N,N,-di-$C_1$–$C_4$alkylsulfamoyl, $C_1$–$C_4$alkylsulfonyl or $C_1$–$C_4$alkoxycarbonyl and Q is a radical of the formula (2a), (2b), (2c) or (2d).

The radicals D which are particularly preferred according to the invention conform to the previously indicated formula (5a), (5b) or (6) or to the formula

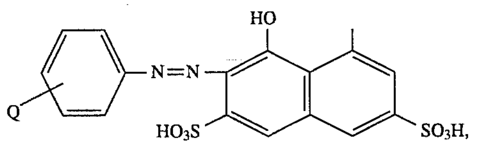

(21a)

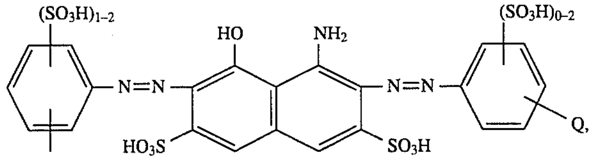

(22a)

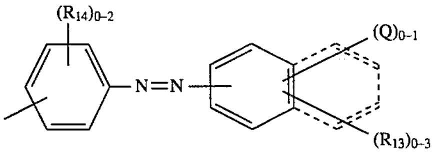

(23)

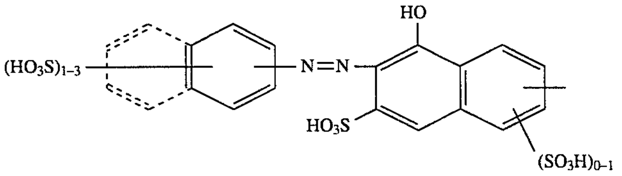

(24)

or

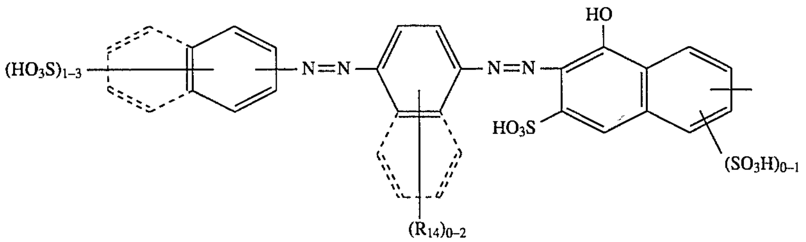

(25)

in which $(R_{13})_{0\text{-}3}$ represents 0 to 3 identical or different radicals $R_{13}$ selected from the group consisting of methyl, methoxy, chlorine and sulfo, $(R_{14})_{0\text{-}2}$ represents 0 to 2 identical or different radicals selected from the group consisting of sulfo, acetylamino, propionylamino, ureido, methyl, methoxy, 2-hydroxyethoxy and 2-sulfatoethoxy, and Q is a radical of the previously indicated formula (2a) or (2b").

A radical $D_1$ of a polyazo, metal complex azo, anthraquinone, triphenedioxazine, phthalocyanine or formazan chromophore is subject to the meanings and preferences previously indicated for D.

A radical $D_1$ of a monoazo chromophore is preferably a radical of the previously indicated formula (1*) in which the variables present therein have the stated meanings and preferences.

Particularly preferably $D_1$ is a radical of the above-indicated formula (5a), (5b), (6), (22), (22a) or (23) or a radical of the formula

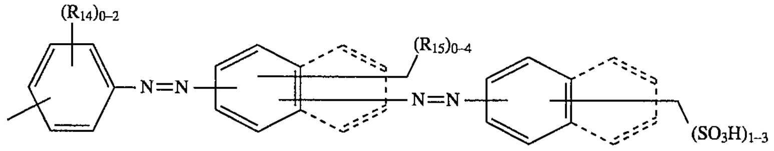

(26)

or

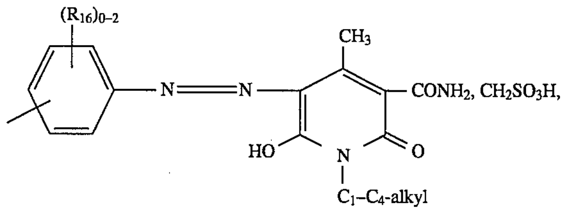

(27)

in which $(R_{14})_{0\text{-}2}$ has the previously indicated meaning, $(R_{15})_{0\text{-}4}$ represents 0 to 4 identical or different radicals selected from the group consisting of sulfo, hydroxyl, amino, methoxy, 2-hydroxyethoxy, 2-sulfatoethoxy, methyl, acetylamino, benzoylamino, propionylamino and ureido, and $(R_{16})_{0\text{-}2}$ represents 0 to 2 identical or different radicals selected from the group consisting of sulfo, methyl, methoxy and chlorine.

The radicals D and $D_1$ can be identical or preferably different.

A preferred embodiment of the present invention concerns compounds of the formula

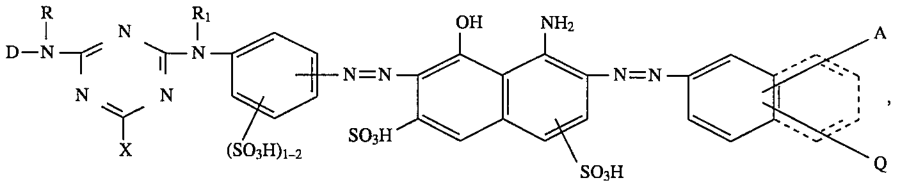

(Ia)

in which A, D, Q, R, $R_1$ and X are each subject to the aforementioned meanings and preferences.

A further preferred embodiment of the present invention concerns compounds of the formula

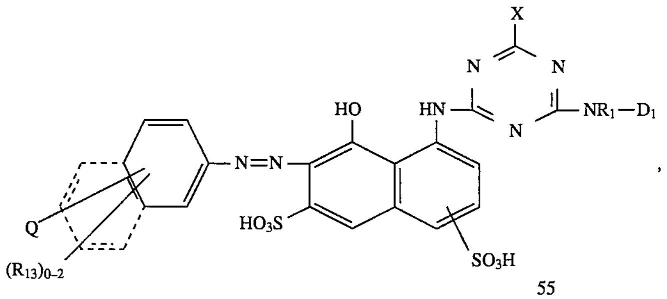

(Ib)

in which $D_1$, Q, $(R_{13})_{0\text{-}2}$ and X are each subject to the aforementioned meanings and preferences.

Examples of suitable radicals D or $D_1$ are:

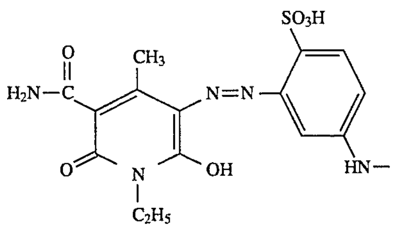
(A1)
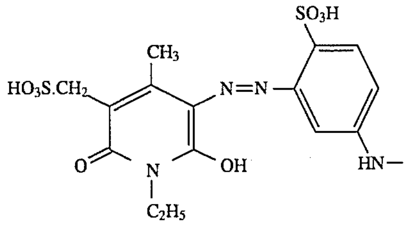
(A2)
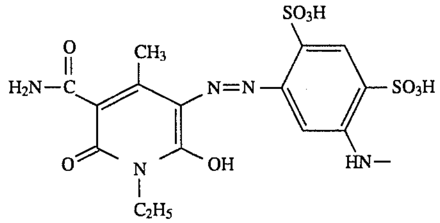
(A3)
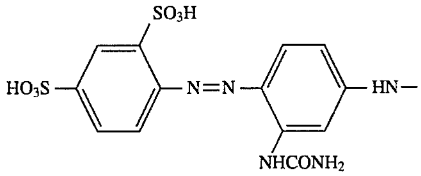
(A4)
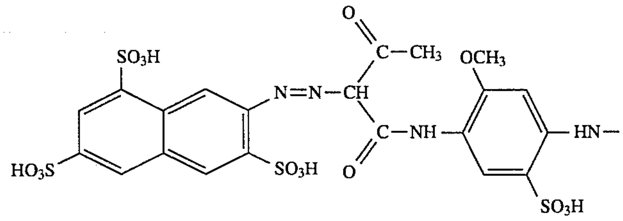
(A5)
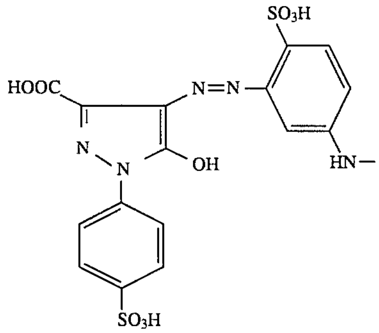
(A6)

-continued
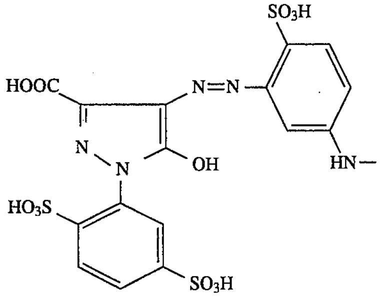
(A7)
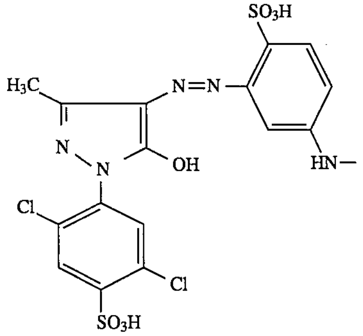
(A8)
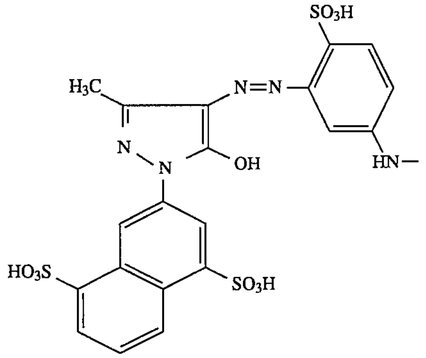
(A9)
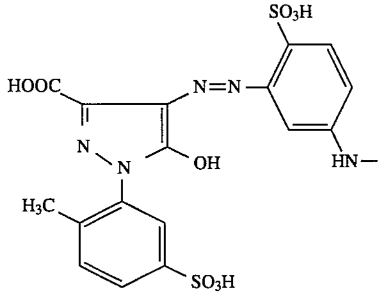
(A10)
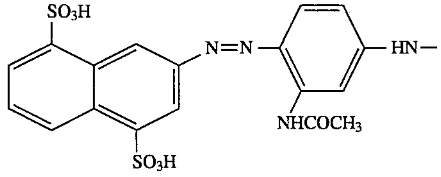
(A11)
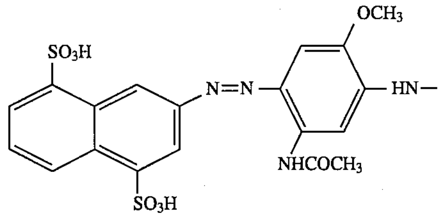
(A12)

-continued
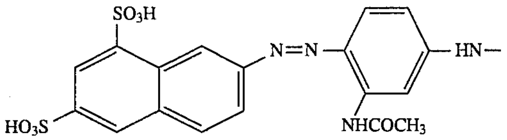
(A13)
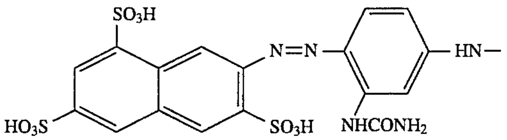
(A14)
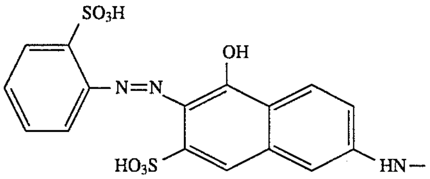
(A15)
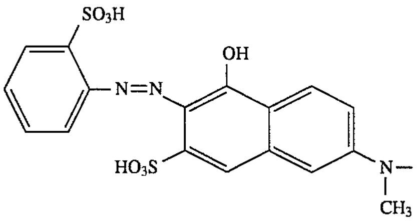
(A16)
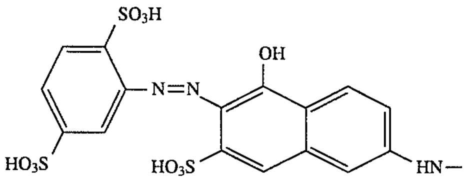
(A17)
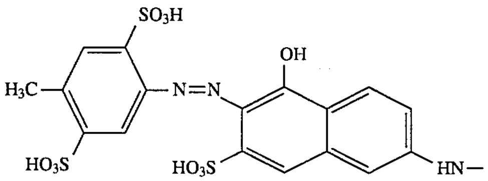
(A18)
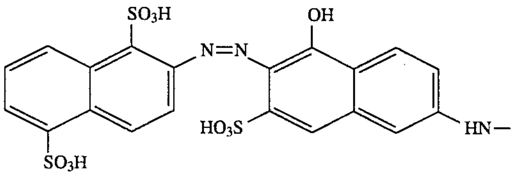
(A19)
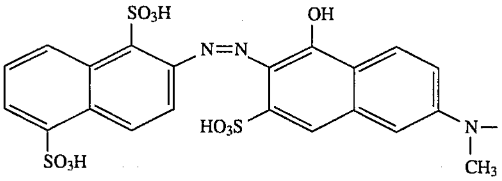
(A20)
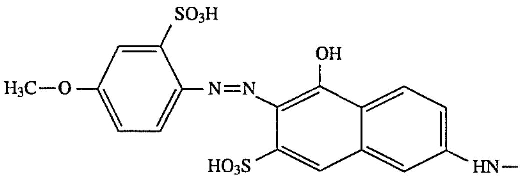
(A21)

-continued
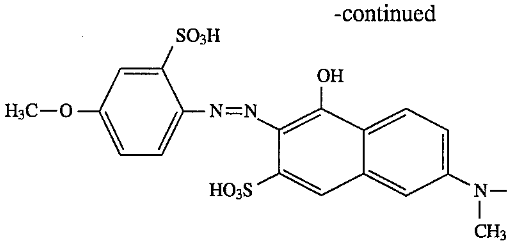
(A22)
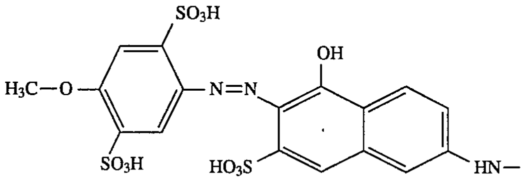
(A23)
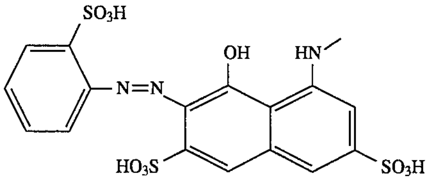
(A24)
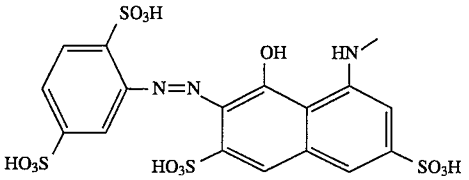
(A25)
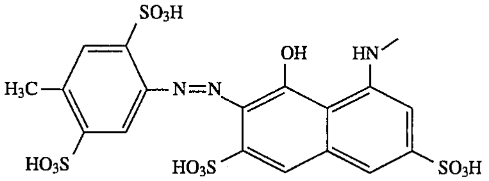
(A26)
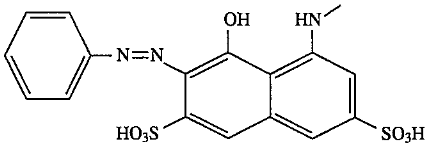
(A27)
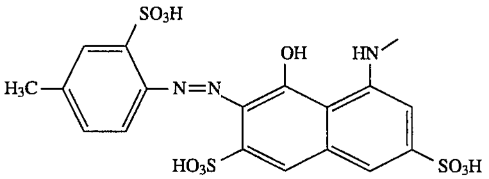
(A28)
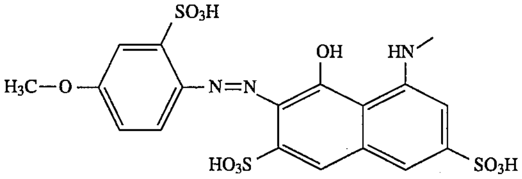
(A29)
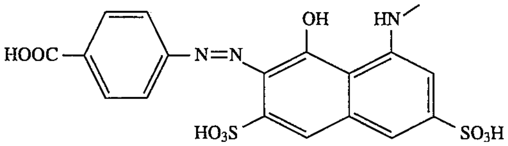
(A30)

-continued
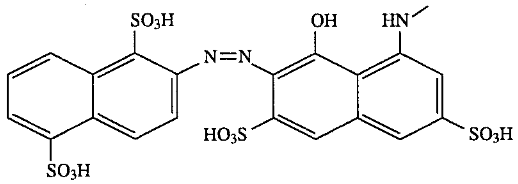
(A31)
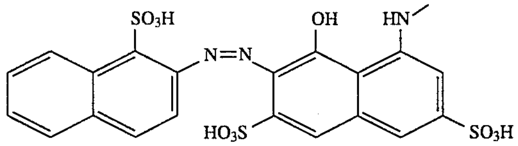
(A32)
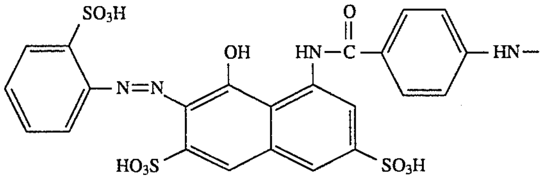
(A33)
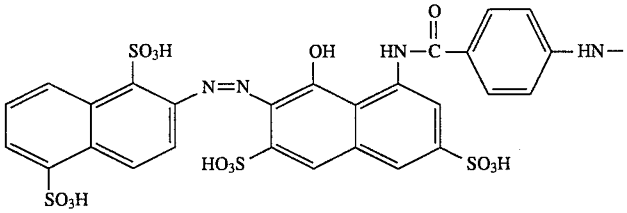
(A34)
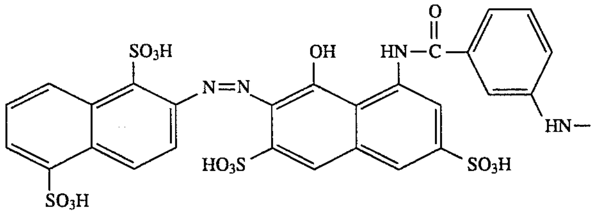
(A35)
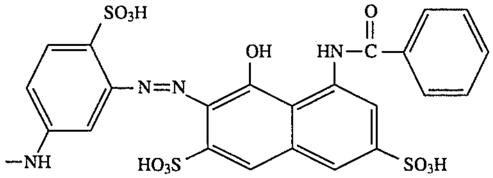
(A36)
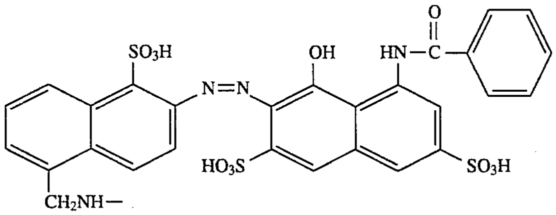
(A37)
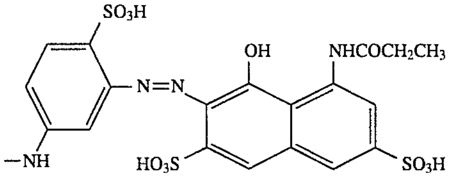
(A38)

-continued
(A39)
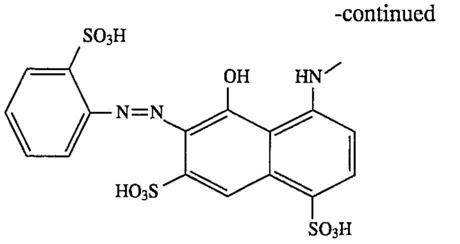
(A40)
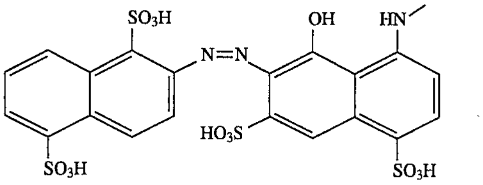
(A41)
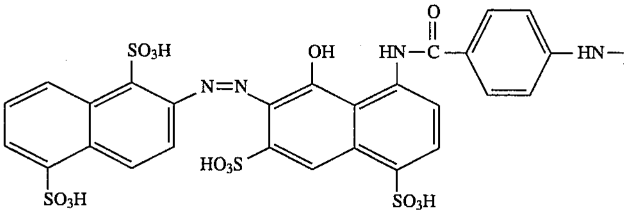
(A42)
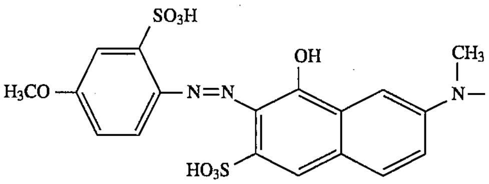
(A43)
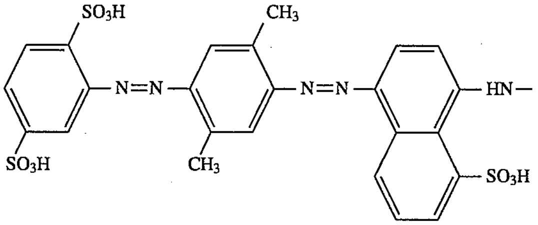
(A44)
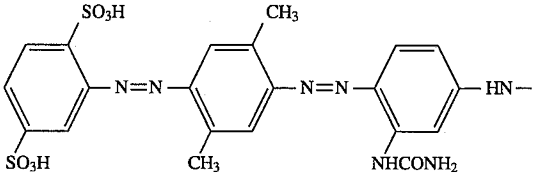
(A44a)
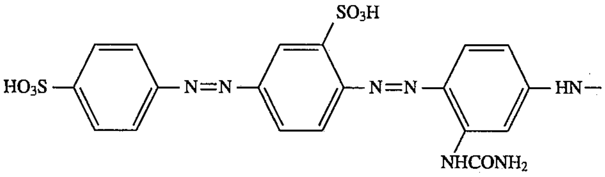
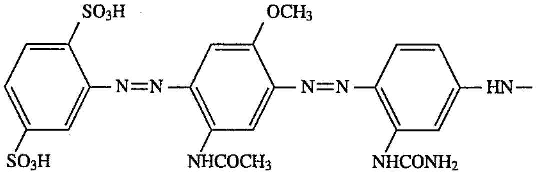

-continued
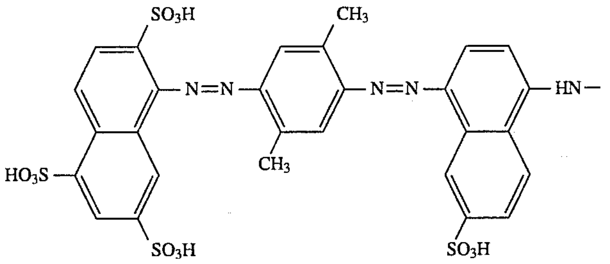
(A45)
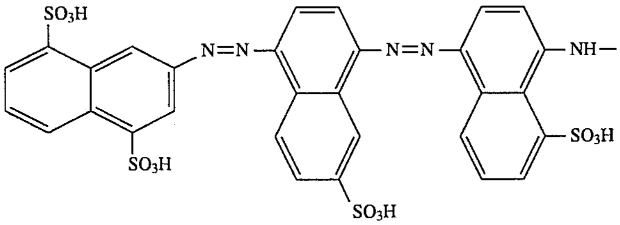
(A46)
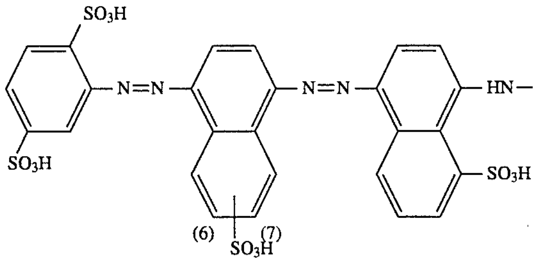
(A47)
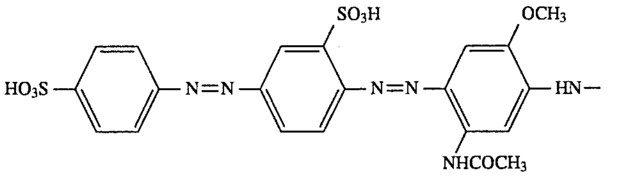
(A48)
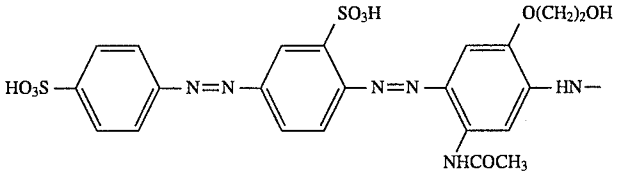
(A49)
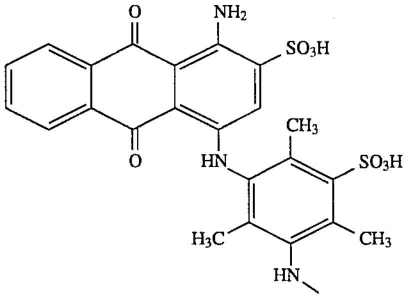
(A50)
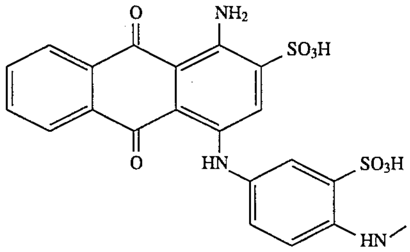
(A51)

-continued
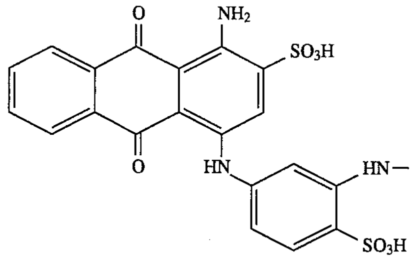
(A52)
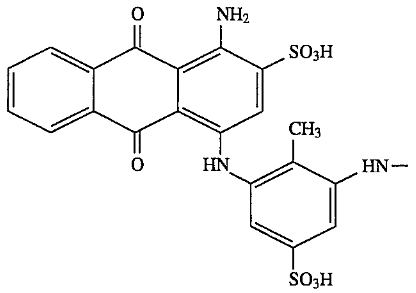
(A53)
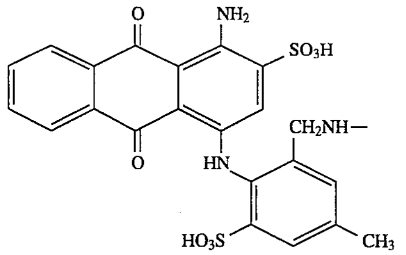
(A54)
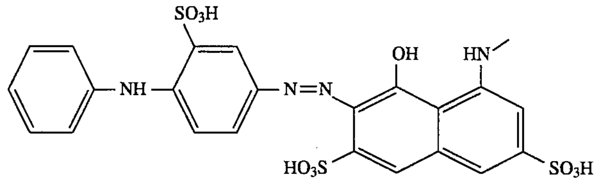
(A55)
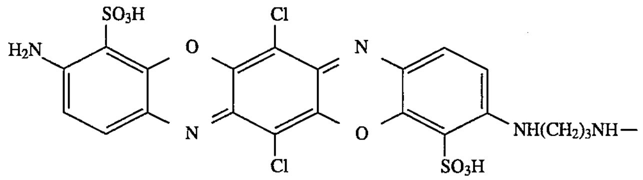
(A56)
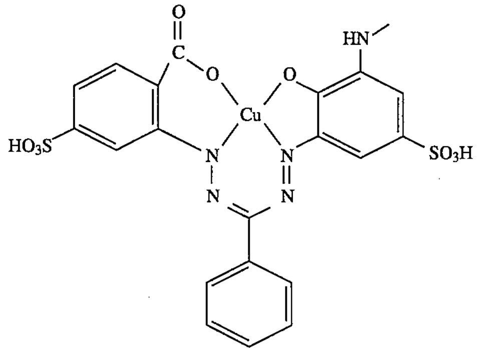
(A57)

-continued
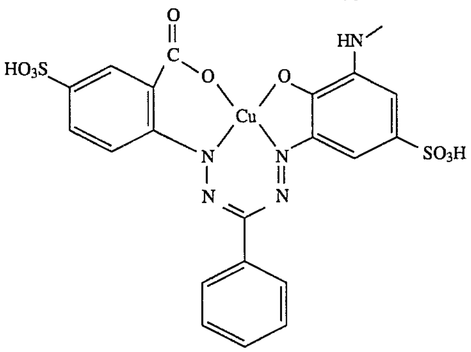
(A58)
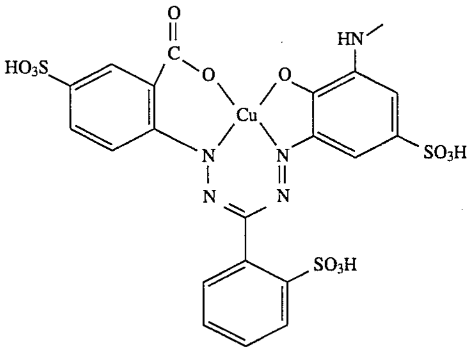
(A59)
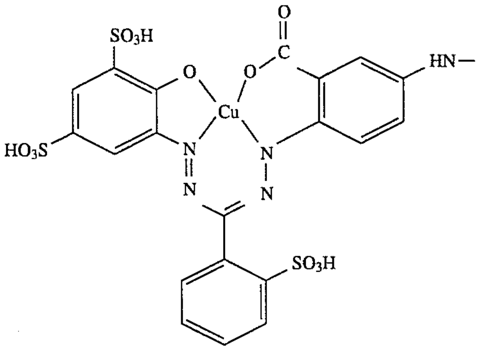
(A60)
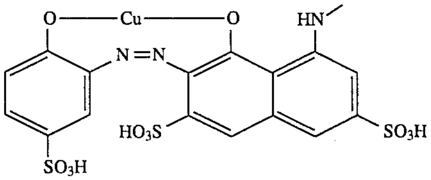
(A61)
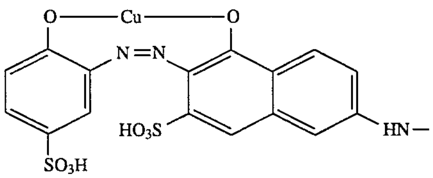
(A62)
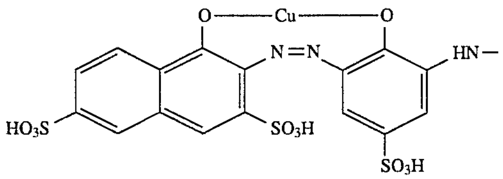
(A63)

-continued
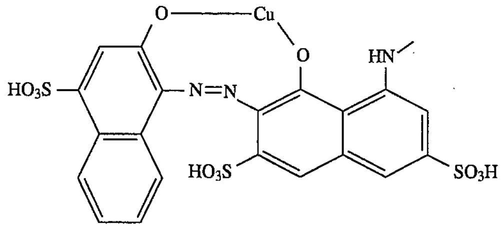
(A64)
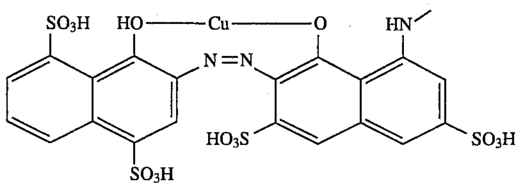
(A65)
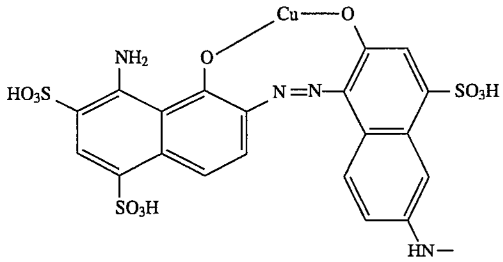
(A66)
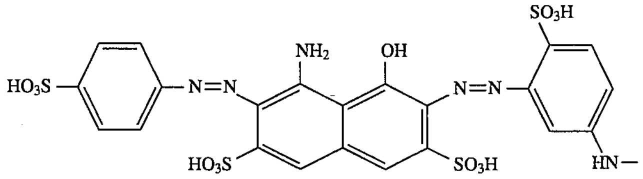
(A67)
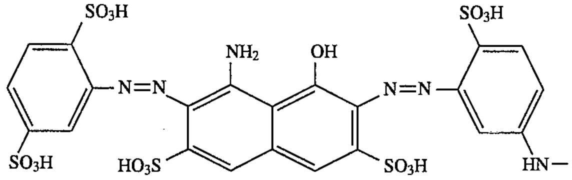
(A68)
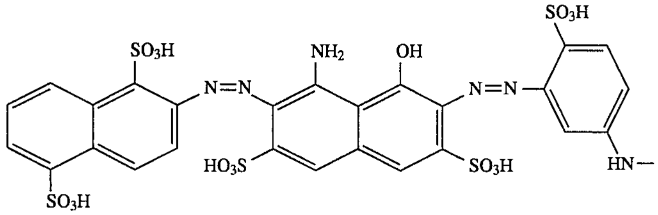
(A69)
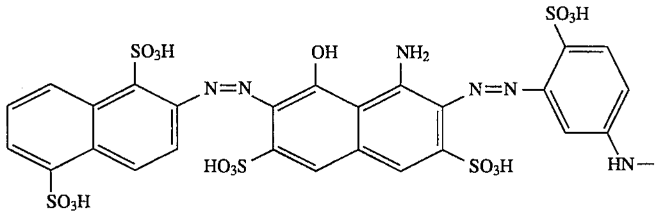
(A70)
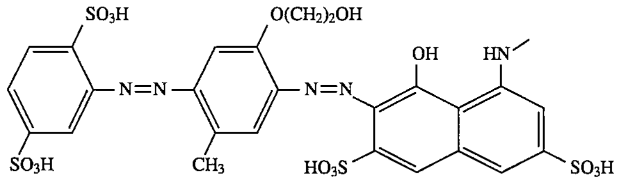
(A71)

-continued
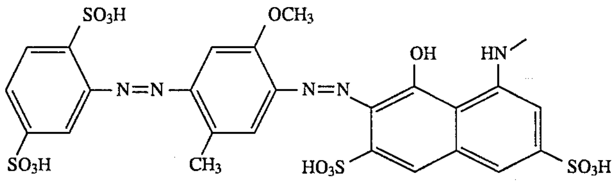
(A72)
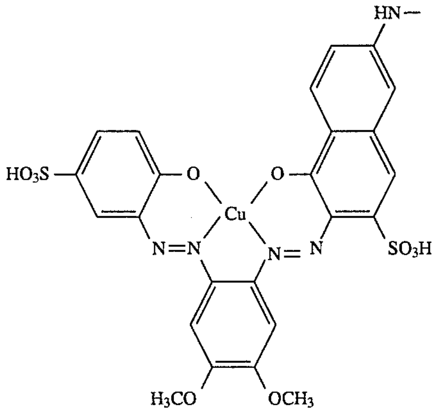
(A73)
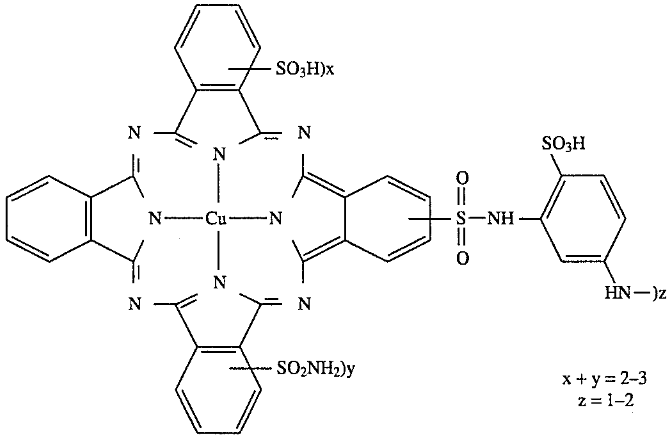
(A74)
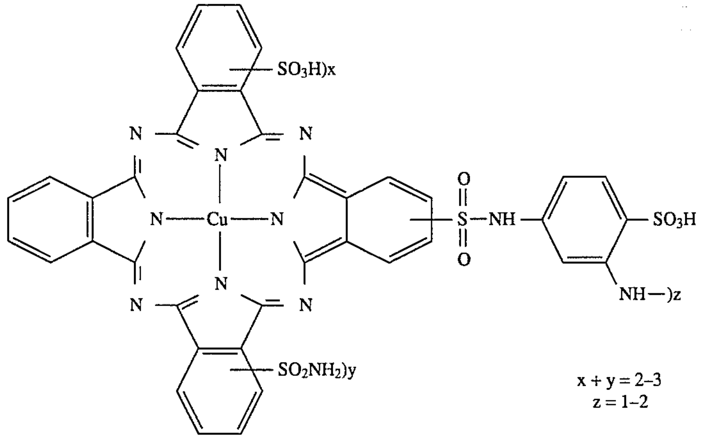
(A75)

-continued
(A76)
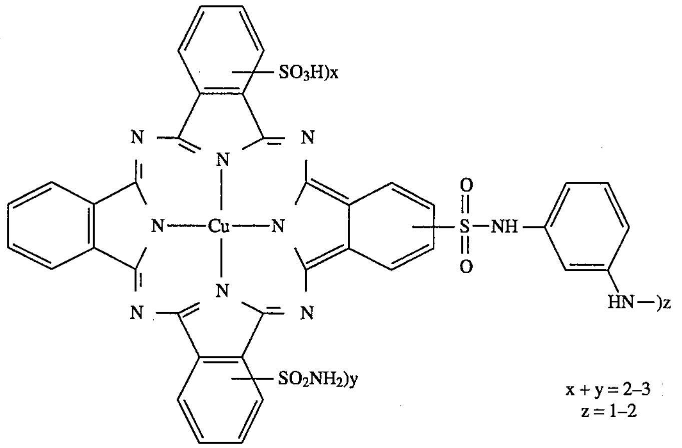
and Z' is a chromophore radical of the formula
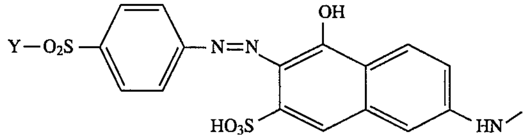
(A101)
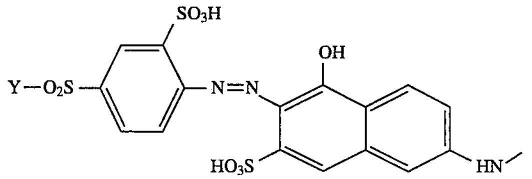
(A102)
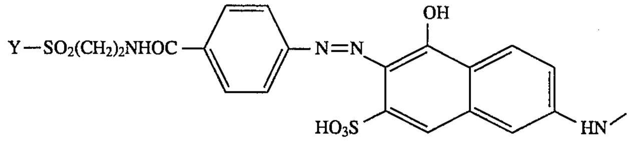
(A103)
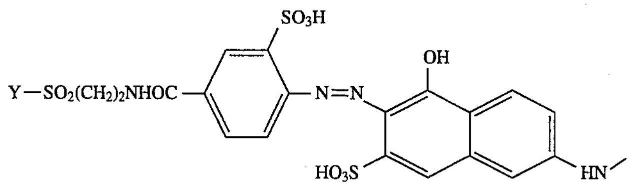
(A104)
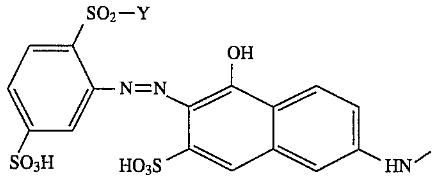
(A105)
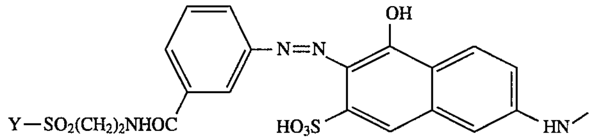
(A106)
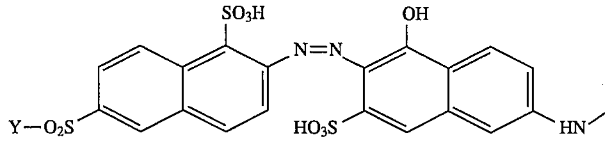
(A107)

-continued
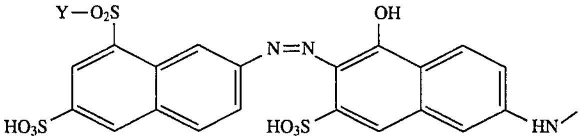
(A108)
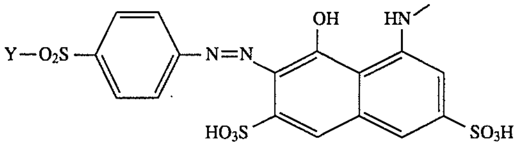
(A109)
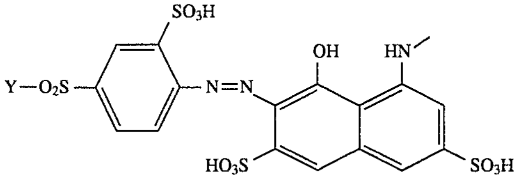
(A110)
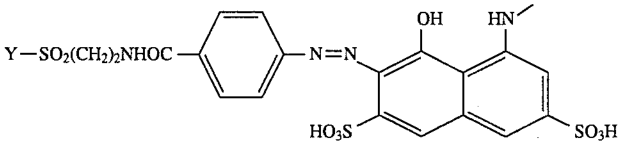
(A111)
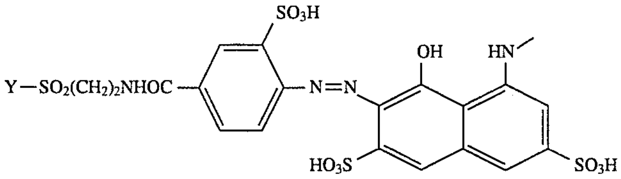
(A112)
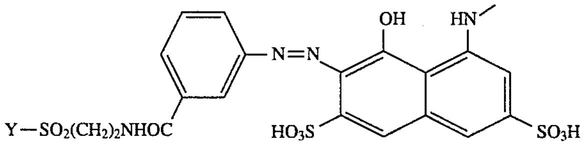
(A113)
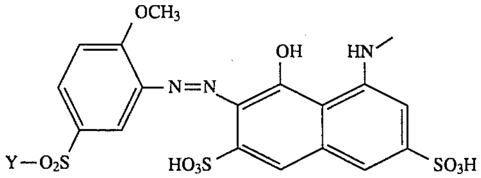
(A114)
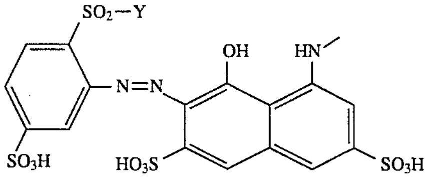
(A115)
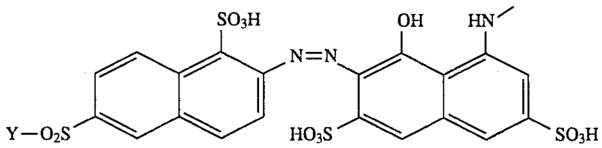
(A116)
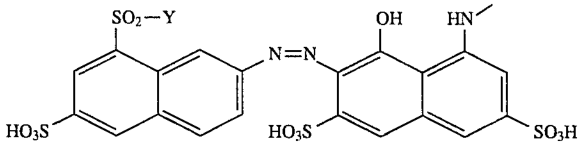
(A117)

-continued
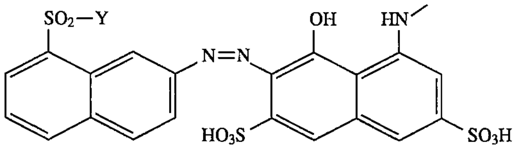
(A118)
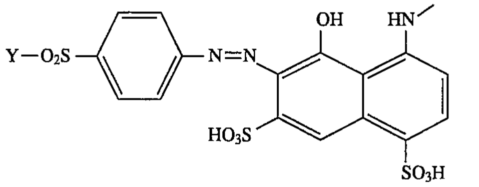
(A119)
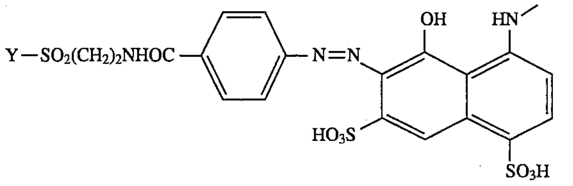
(A120)
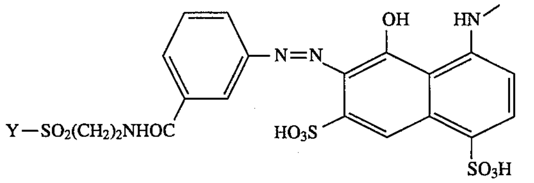
(A121)
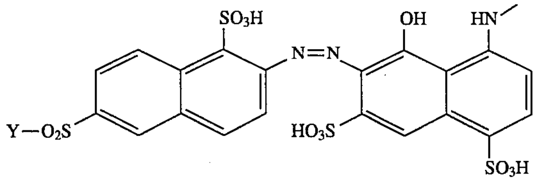
(A122)
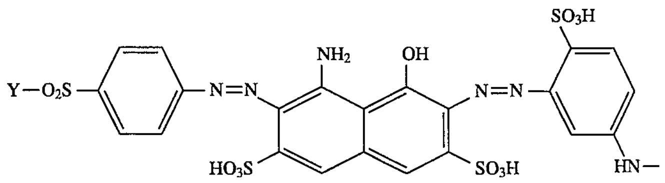
(A123)
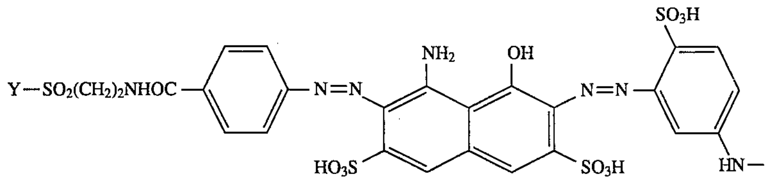
(A124)
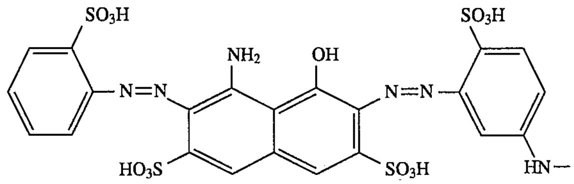
(A124a)
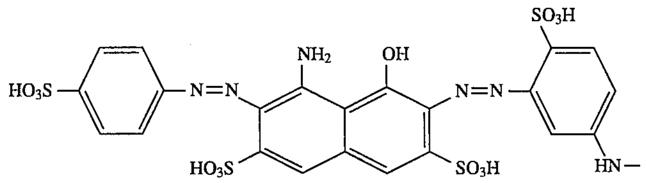
(A124b)

-continued

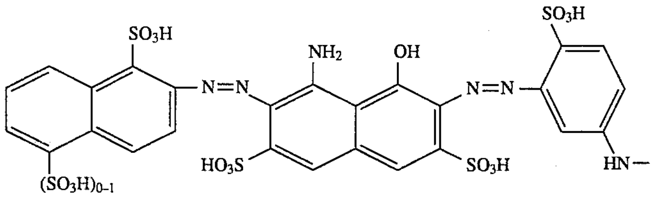

(A124c)

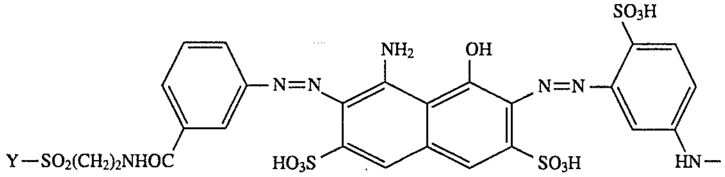

(A125)

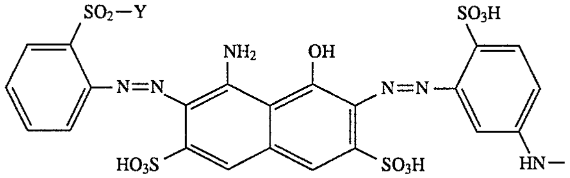

(A126)

and Y is subject to the aforementioned meanings and preferences.

A preferred embodiment of the present invention concerns compounds of the formula

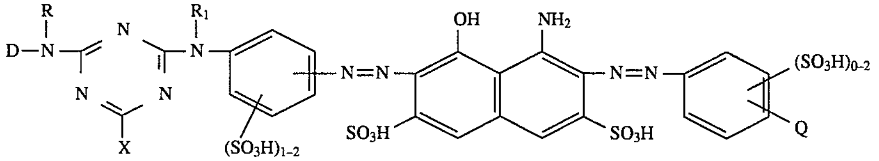

(Ia')

in which R and $R_1$ are each independently of the other hydrogen, methyl or ethyl, X is chlorine or fluorine, Q is a radical of the formula (2a) or (2b") indicated above, and D is a radical of the formula (5b) indicated above which apart from sulfo carries no further substituents, or a radical of the formula (6), (21a), (23), (24) or (25) indicated above.

A further preferred embodiment of the present invention concerns compounds of the formula (1b')

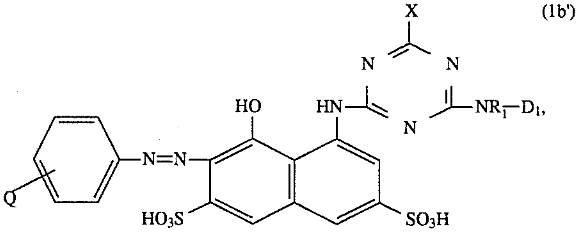

in which $R_1$ is hydrogen, methyl or ethyl, X is chlorine or fluorine, Q is a radical of the above-indicated formula (2a) or (2b") and $D_1$ is a radical of the formula (5b) indicated above which apart from sulfo contains no further substituents or is a radical of the formula (22), (23), (26) or (27) indicated above.

The compounds of the formula (1) are fibre-reactive. Fibre-reactive compounds are to be understood as meaning compounds capable of reacting with the hydroxyl groups of cellulose, the amino, carboxyl, hydroxyl and thiol groups in the case of wool and silk, or with the amino and possibly carboxyl groups of synthetic polyamides to form covalent chemical bonds.

The compounds of the formula (1) have at least two and preferably four to eight sulfo groups, which are in each case present in the form of the free acid or preferably in salt form, for example as sodium, lithium, potassium or ammonium salt. The compounds of the formula (1) can also be in the form of a mixed salt, for example in the form of an Na/Li or $Na/Li/NH_4$ salt.

The reactive dyes of the formula (1) can be prepared in a manner known per se, for example by reacting about a mole equivalent of an organic dye of the formula $$D_1—NHR_1 \quad (28),$$

about a mole equivalent of a compound of the formula $$D—NHR \quad (29)$$

or suitable precursors of the compounds of the formulae (28) or (29) and about a mole equivalent of a halotriazine, preferably 2,4,6-trichloro- or 2,4,6-trifluoro-s-triazine, with one another in any desired order or, if precursors of the compounds of the formulae (28) or (29) were used, converting the resulting intermediates into the desired dyes and, if desired, following up with a further conversion reaction, for example to convert a halogen atom on the trianine into any desired radical X, where D, $D_1$, R, $R_1$ and X are subject to the meanings and preferences indicated above.

The conversion of intermediates into the final dyes, which becomes necessary on account of the use of precursors of the compounds of the formulae (28) or (29), is in particular a coupling reaction leading to azo dyes.

Since the individual above-indicated process steps can be carried out in various orders, in some instances even simultaneously, various process variants are possible. Generally the reaction is carried out in successive steps with the order of the elementary, known reactions between the individual reaction components depending on the particular conditions.

A preferred process for preparing dyes of the previously-indicated formula (1a) comprises for example reacting about 1 equivalent of an organic dye of the formula

D—NHR (29)

or a dye precursor, about 1 equivalent of 2,4,6-trifluoro-s-triazine (cyanuric fluoride) or 2,4,6-trichloro-s-triazine (cyanuric chloride), about 1 equivalent of the compound of the formula

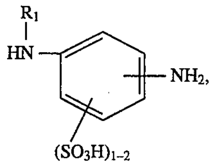

(30)

about 1 equivalent of the compound of the formula

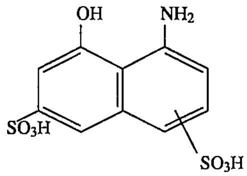

(31)

and about 1 equivalent of a compound of the formula

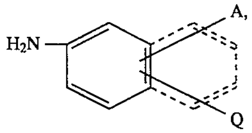

(32)

in which A, D, R, $R_1$ and Q are each as defined above, with one another in any desired order by diazotization and coupling or, if dye precursors are used, converting the resulting intermediates into the desired dyes with or without a further conversion reaction.

A preferred variant for preparing the compounds of the formula (1a) concerns the preparation of a compound of the formula

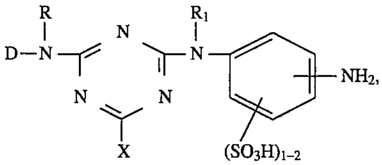

(34)

diazotization of this compound and coupling onto a compound of the formula

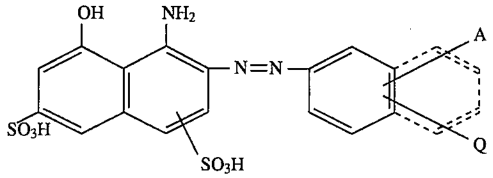

(35)

in which A, D, R, $R_1$, X and Q are each as defined above. This route is preferred in the synthesis of compounds of the formula (1a) in which D is the radical of a monoazo, polyazo or metal complex azo chromophore.

The invention further provides a process for dyeing and printing cellulose-containing fibre materials with the dyes of the invention. Suitable fibre materials include for example the natural cellulose fibres, such as cotton, linen and hemp, and also pulp and regenerated cellulose. The dyes are also suitable for dyeing or printing hydroxyl-containing fibres present in blend fabrics, for example blends of cotton with polyamide fibres or in particular with polyester fibres.

The dyes of the invention can be applied to and fixed on the fibre material in various ways, in particular in the form of aqueous dye solutions and print pastes. They are suitable not only for the exhaust method but also for dyeing by the padding method, whereby the material is impregnated with aqueous, salt-containing or salt-free dye solutions and the dyes are fixed after an alkali treatment or in the presence of alkali with or without heating. After fixing, the dyeings or prints are thoroughly rinsed with cold and hot water with or without an agent which has a dispersing action and promotes the diffusion of the unfixed portions. Dyeing and printing are carried out using the customary dyeing and printing processes.

The amounts in which the reactive dyes are used in the dyebaths or print pastes of the process of the invention can vary according to the desired depth of shade; generally amounts from 0.01 to 10 per cent by weight, in particular

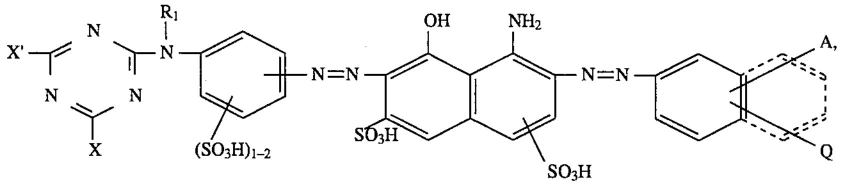

(33)

in which A, $R_1$, X and Q are each as defined above and X' is halogen, preferably chlorine or fluorine, and the further reaction thereof with a compound of the previously indicated formula (29). This route is especially suitable for compounds of the formula (1a) in which D is the radical of an anthraquinone, phthalocyanine, formazan or dioxazine chromophore.

A further preferred variant for preparing the compounds of the formula (1a) concerns the preparation of a compound of the formula from 0.1 to 6 per cent by weight, on weight of fibre, are suitable.

The dyeing liquors may contain the generally customary additions, for example the aqueous solutions of inorganic salts, for example of alkali metal chlorides or alkali metal sulfates, alkali metal hydroxides, urea, thickenings, for example alginate thickenings, water-soluble cellulose alkyl ethers and also dispersants, levelling agents and migration coinhibitors, further sodium m-nitrobenzensulfonate and as further thickeners for example methylcellulose, starch ethers, emulsion thickenings, preferably an alginate, e.g. sodium alginate, and also wetting agents.

The process of the invention is preferably carried out as a dyeing by the exhaust method. In this case dyeing generally takes place from an aqueous medium at a liquor ratio of for example 2:1 to 60:1, in particular at a liquor ratio from 5:1 to 20:1, at a dyebath pH for example 6 to 13 and at a temperature of for example 40° to 110° C., in particular at a temperature from 60° to 95° C.

The dyes of the invention are notable for good fixation and very good build-up. They are notable for a high degree of exhaustion and can be applied by the exhaust method over a very wide temperature range and are therefore also suitable for dyeing cotton-polyester blend fabrics under the conditions recommended for such fabrics. The dye mixtures of the invention are also suitable for printing, in particular cotton or blend fabrics containing for example wool or silk.

The dyeings and prints on cellulose fibre materials prepared with the dyes of the invention have a high colour strength and a high fibre-dye bond stability not only in the acid but also in the alkaline range, also good lightfastness and very good wet fastness properties, such as wash, water, seawater, cross-dyeing and perspiration fastness properties, and also good fastness to dry heating setting and pleating.

The Examples which follow illustrates the invention. The temperature are given in degrees Celsius, and the parts and percentages are by weight, unless otherwise stated. Parts by weight relate to parts by volume as the kilogram to the liter.

EXAMPLE 1

A neutral solution of 106 parts of the compound of the formula

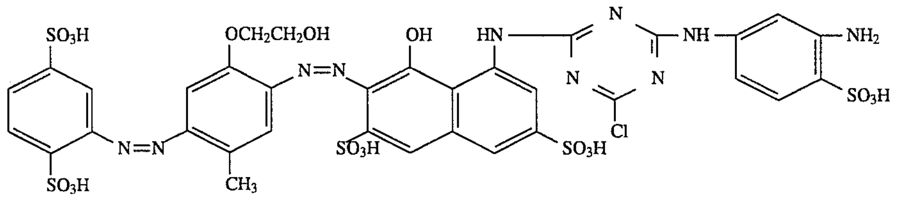

(101)

in 1000 parts of water is admixed at a temperature of about 0° C. with 7 parts of sodium nitrite and 25 parts of 32% hydrochloric acid and stirred for an hour. The excess nitrite is destroyed with a little sulfamic acid and the suspension of the diazonium salt is added dropwise into a cold neutral solution of 61 parts of 1-amino-2[4-(2-sulfatoethylsulfonyl)phenylazo]-8-hydroxynaphthalene-3,6-disulfonic acid while the pH is kept constant by the addition of sodium hydroxide solution. The solution is warmed to room temperature, and freed of salt by dialysis, and the dye of the formula

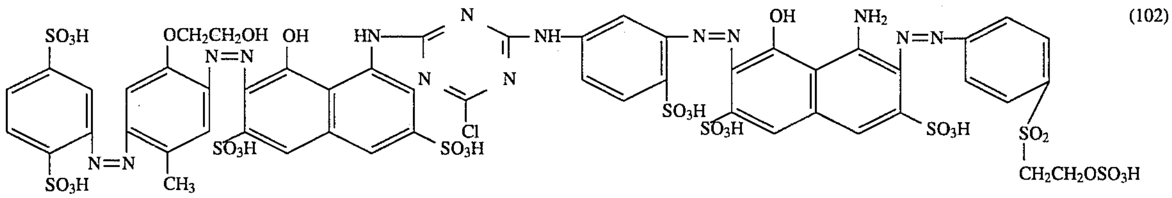

(102)

is isolated by evaporating to dryness. The powder obtained dyes cellulose in bright navy shades having good allround fastness properties.

EXAMPLE 2

A neutral solution of 104 parts of the compound of the formula

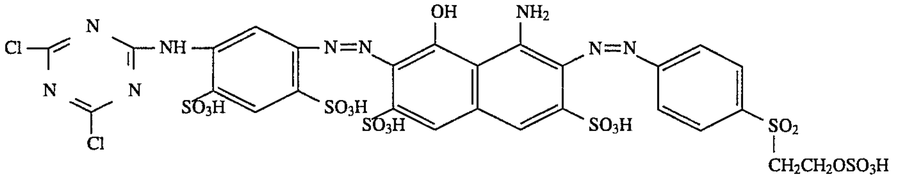

(201)

in 1000 parts of water is added at a temperature of about 0° C. to a cold neutral solution of 53 parts of the compound of the formula

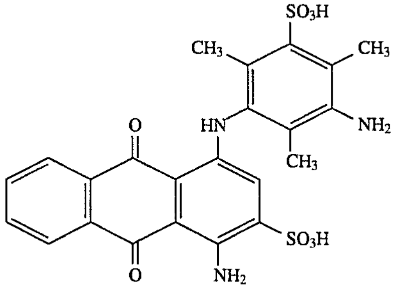

(202)

while the pH is kept constant by the addition of sodium hydroxide solution. The solution is warmed to room temperature and freed of salt by dialysis and the dye of the formula (203)

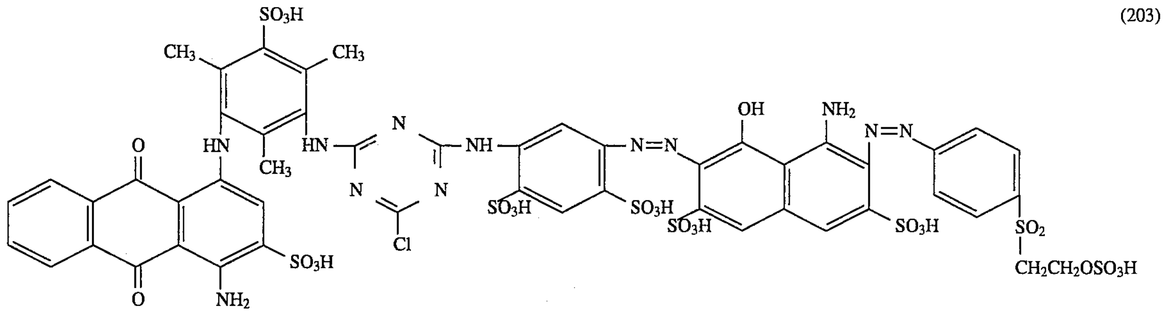

is isolated by evaporation to dryness. The powder obtained dyes cellulose in bright blue shades having good allround fastness properties.

EXAMPLES 3–9

Example 1 is repeated using instead of the compound (101) a compound of the general formula

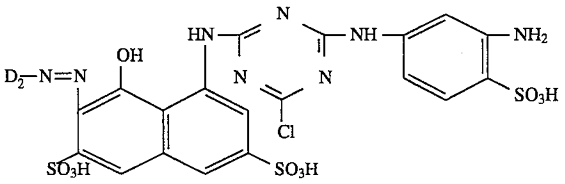

in which $D_2$ has the meanings specified in the table below. This results in analogous dyes which each dye cotton with good allround fastness properties.

3

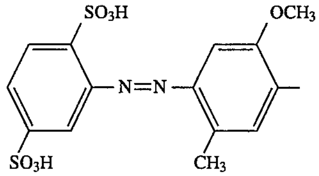

4

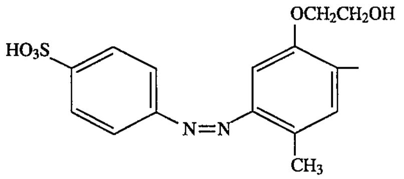

5

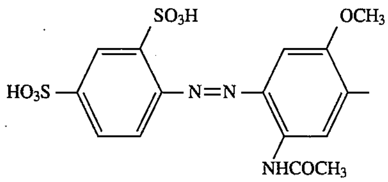

6

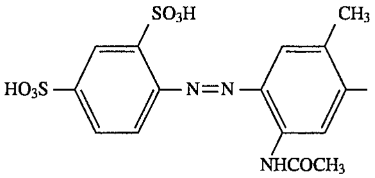

-continued

7

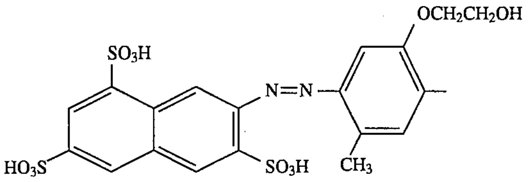

8

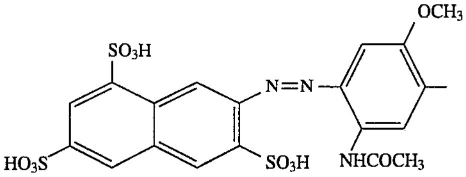

9

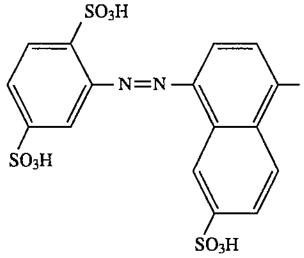

EXAMPLES 10–13

Example 2 is repeated using instead of the compound (202) the compounds mentioned in the table below. This results in analogous dyes which each dye cotton with good allround fastness properties

10

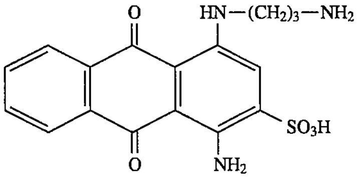

11

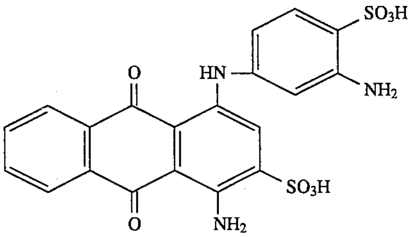

-continued
12
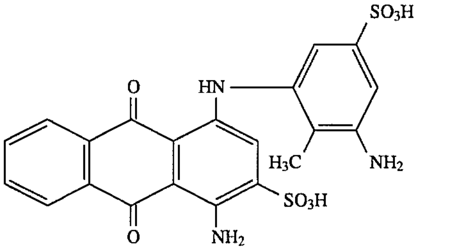
13
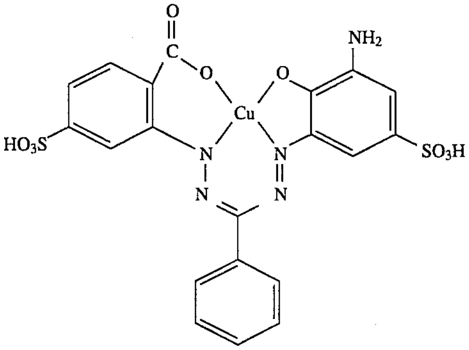
EXAMPLES 14–17
The method of Examples 1 to 13 can be used to prepared the following compounds which each dye cotton with good allround fastness properties:
14
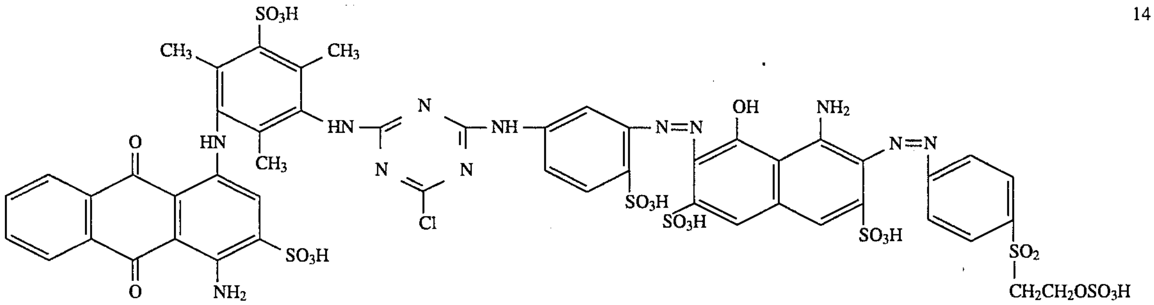
15
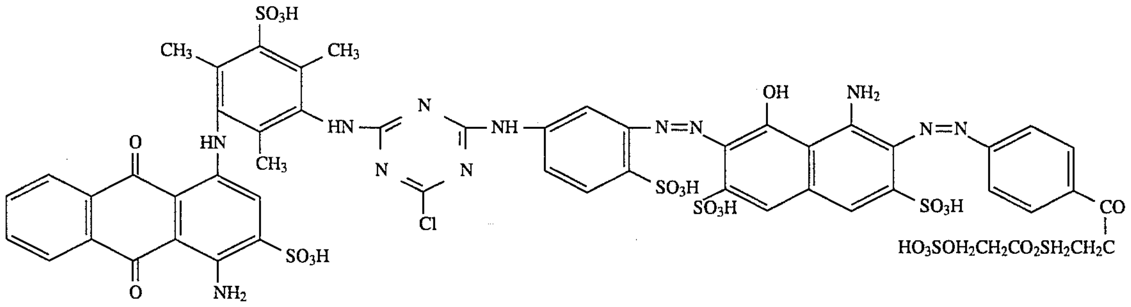
16
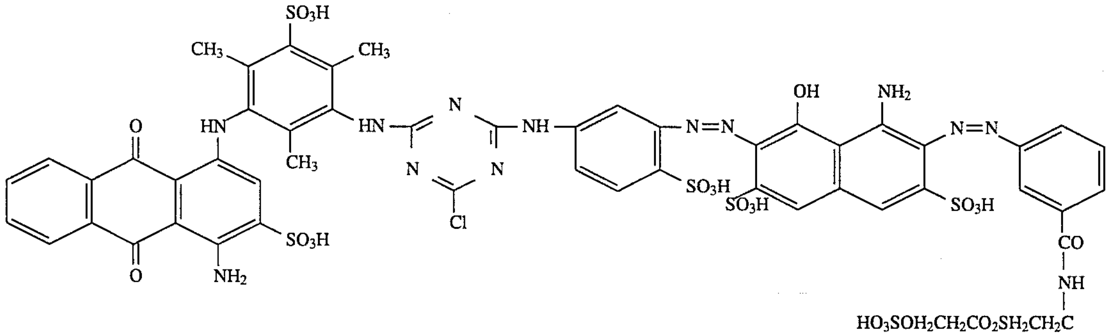

-continued

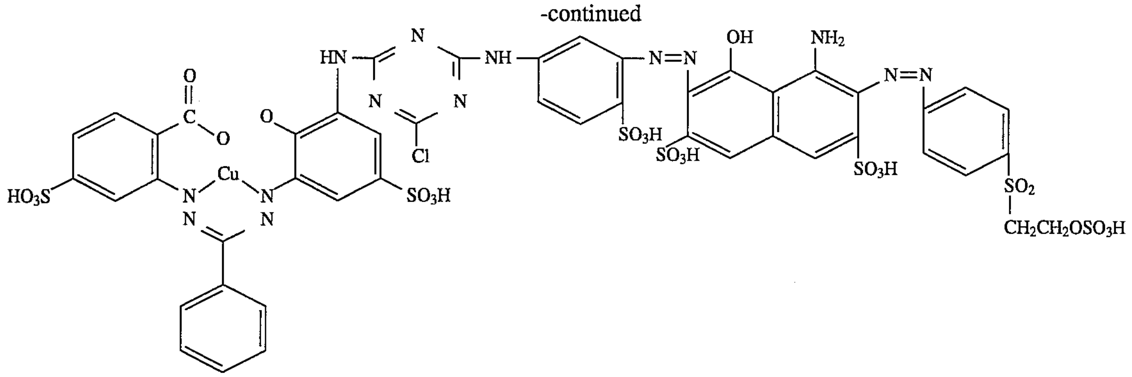

17

EXAMPLE 18

Examples 1 to 17 are repeated using instead of the chlorotriazinyl-containing precursor the corresponding fluorotriazinyl-containing precursor. This results in the analogous fluorotriazinyl compounds.

EXAMPLES 19–48

The method of Examples 1 and 2 can be used to prepare the following dyes which dye cotton with good allround fastness properties in the indicated hue:

| | | |
|---|---|---|
| 19 | 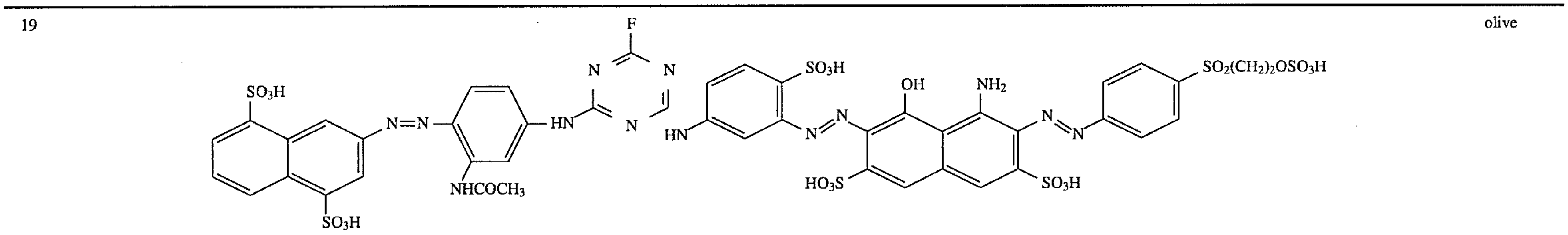 | olive |
| 20 | 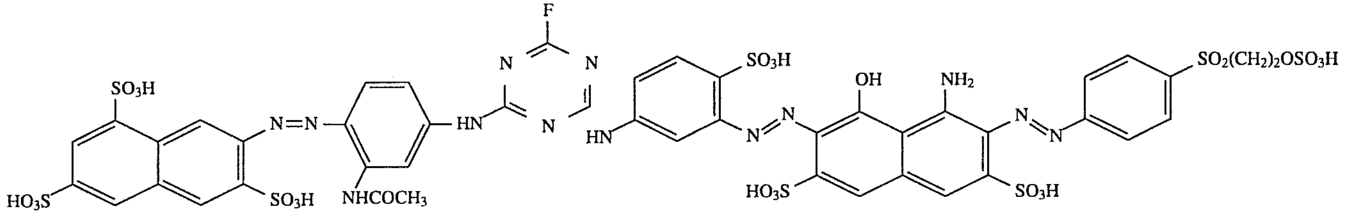 | olive |
| 21 | 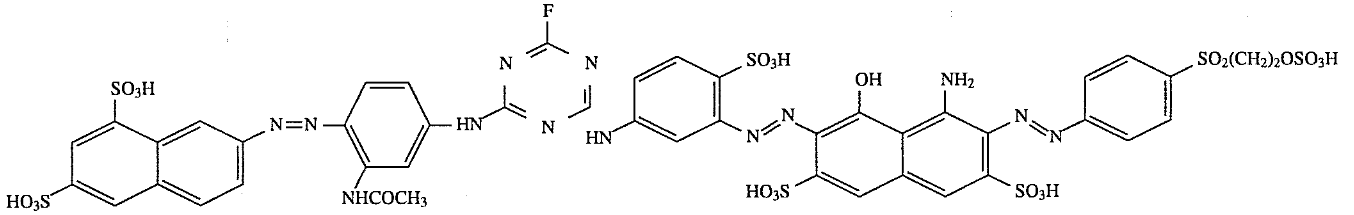 | olive |
| 22 | 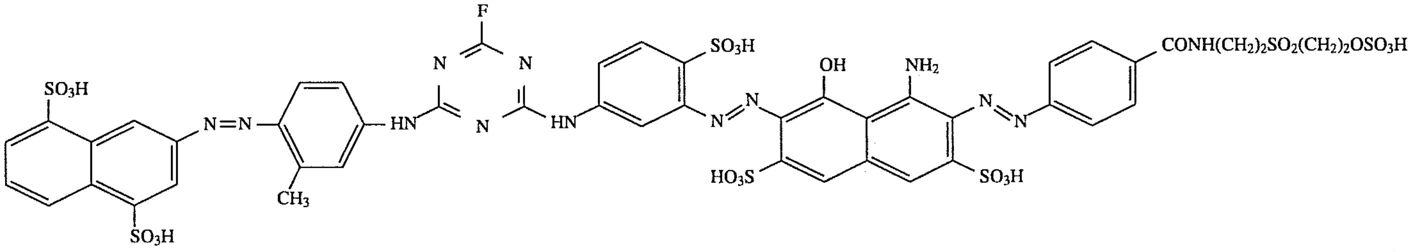 | olive |

-continued
| | | |
|---|---|---|
| 23 | 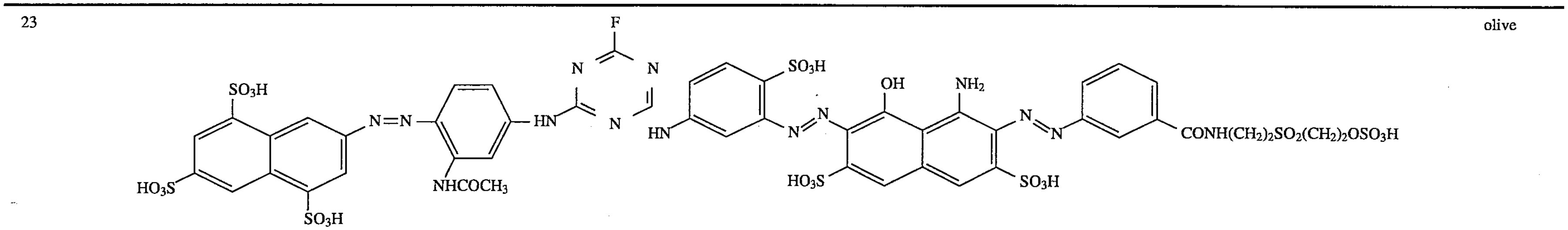 | olive |
| 24 | 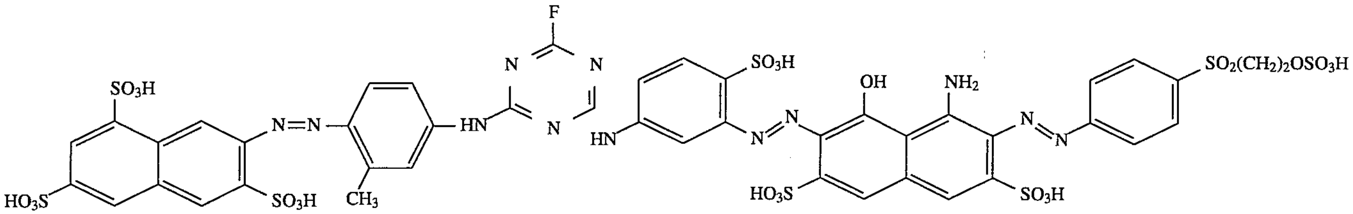 | olive |
| 25 | 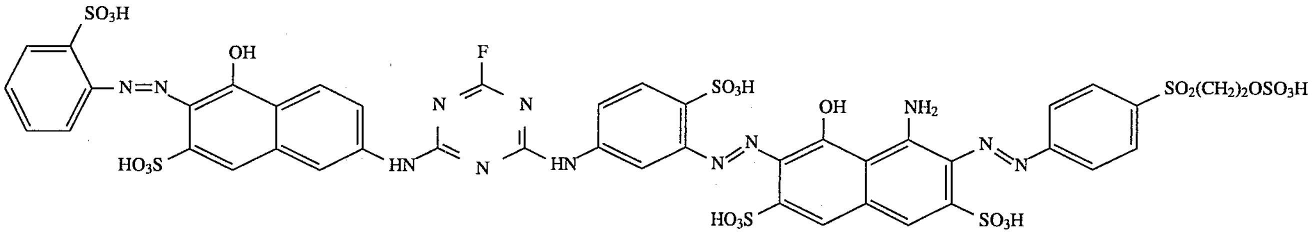 | olive |
| 26 | 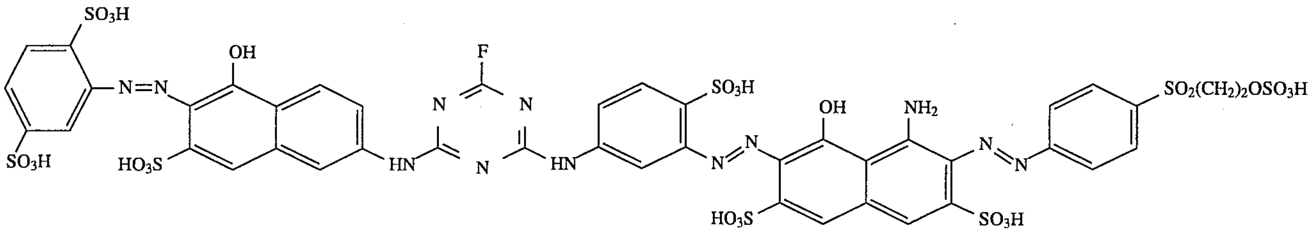 | olive |

-continued
| | | |
|---|---|---|
| 27 | 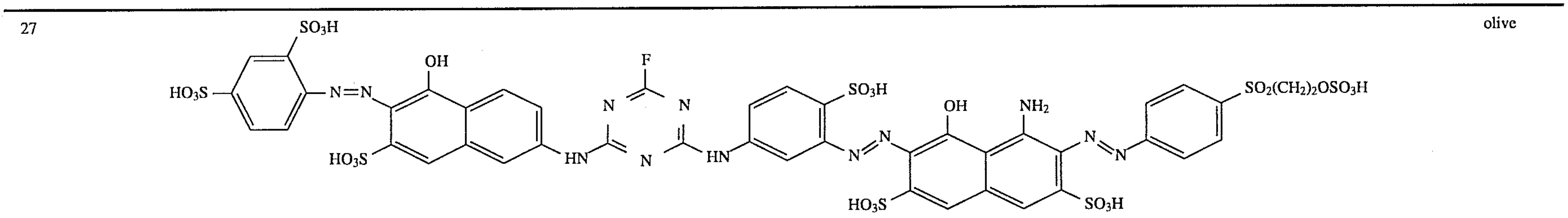 | olive |
| 28 | 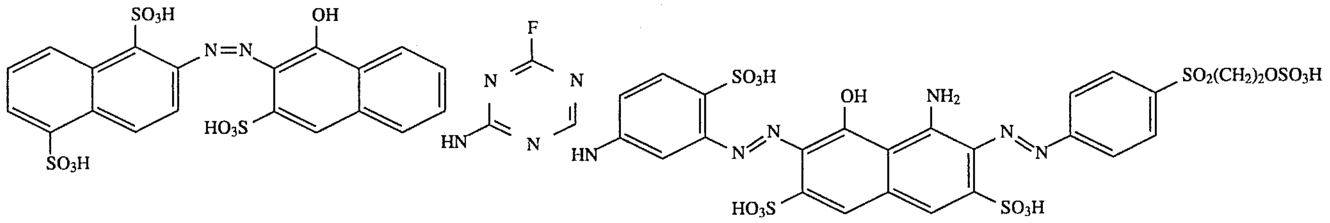 | olive |
| 29 | 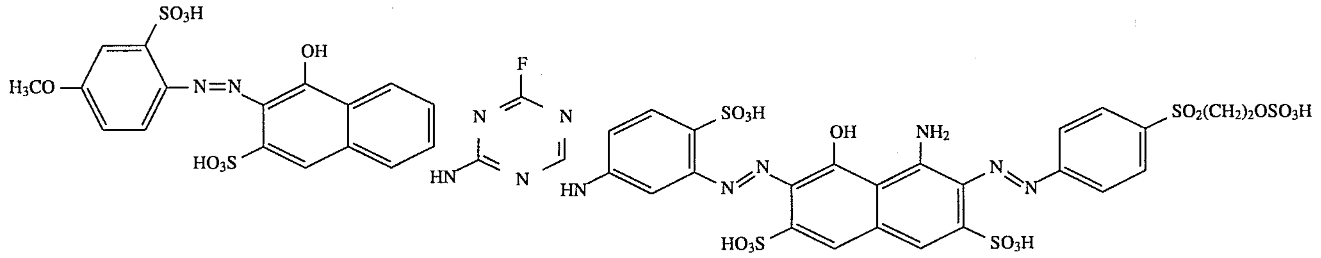 | violet |
| 30 | 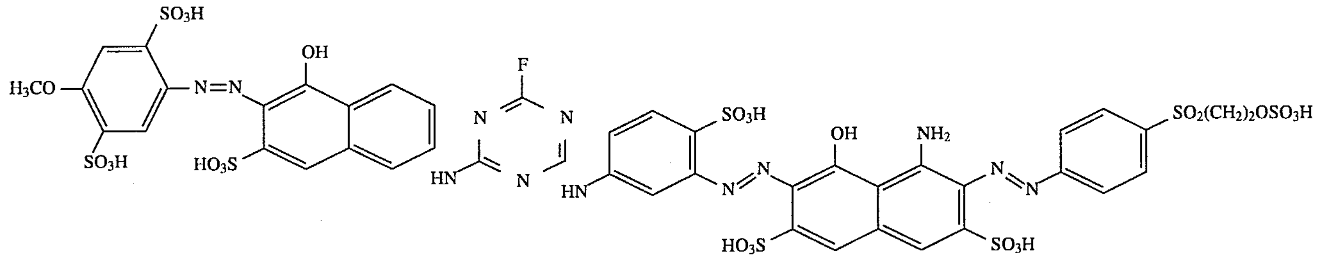 | violet |

-continued
31 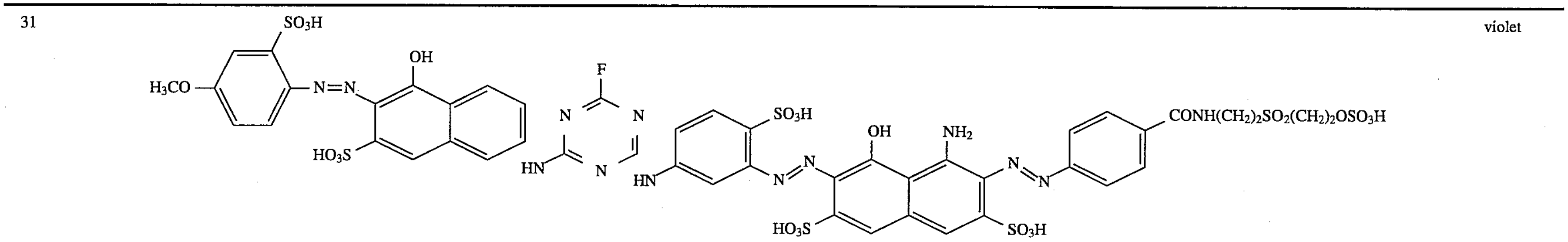 violet
32 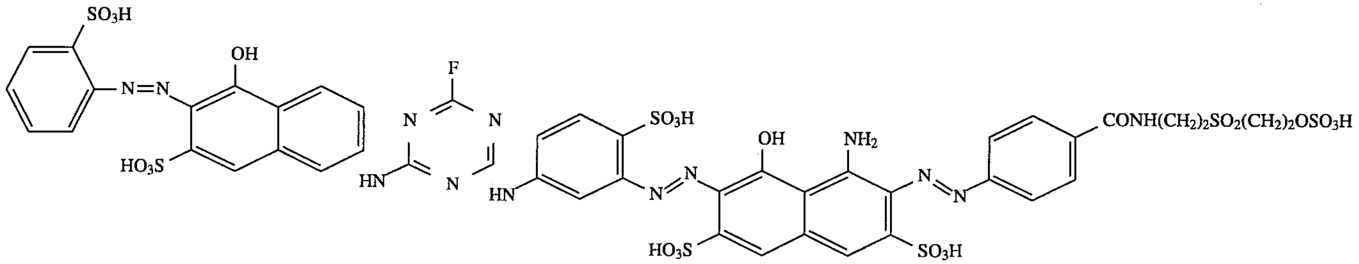 olive
33 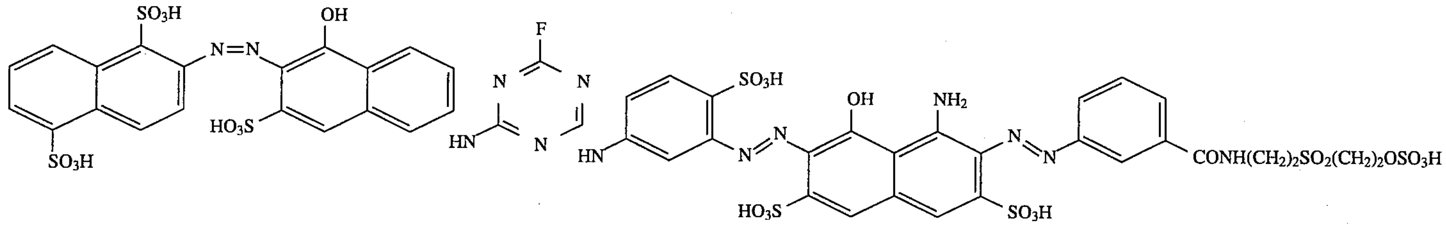 olive
34 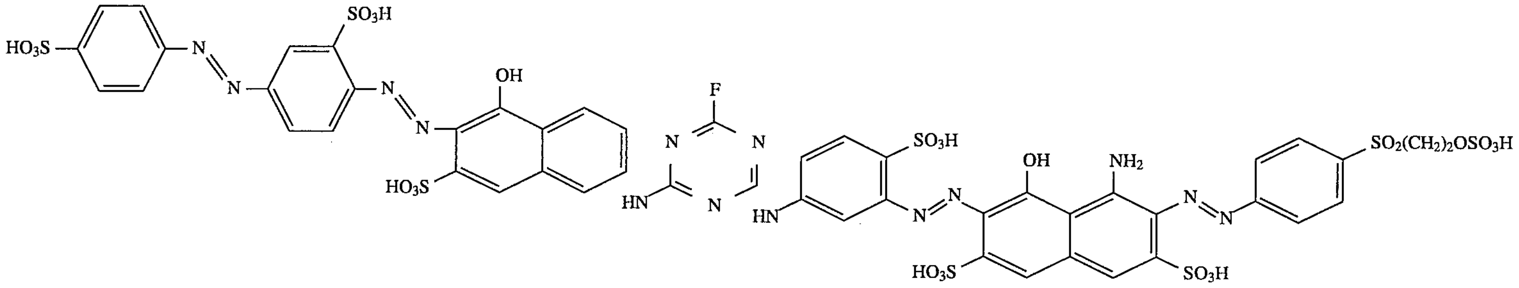 dark blue -continued
| | | |
|---|---|---|
| 35 | 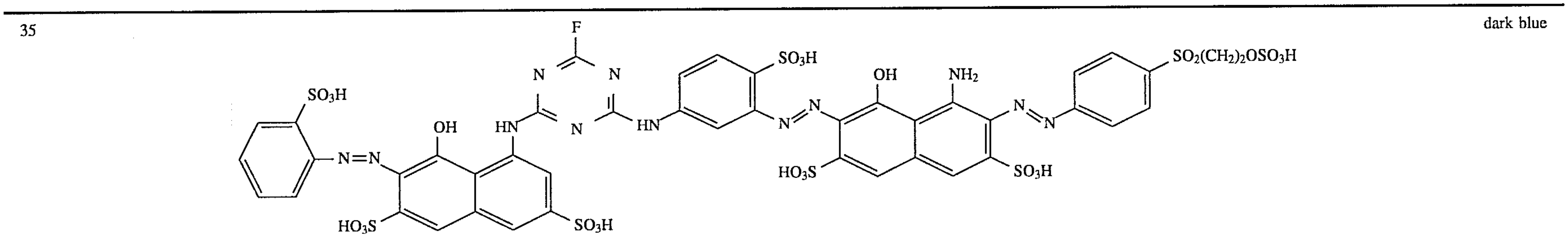 | dark blue |
| 36 | 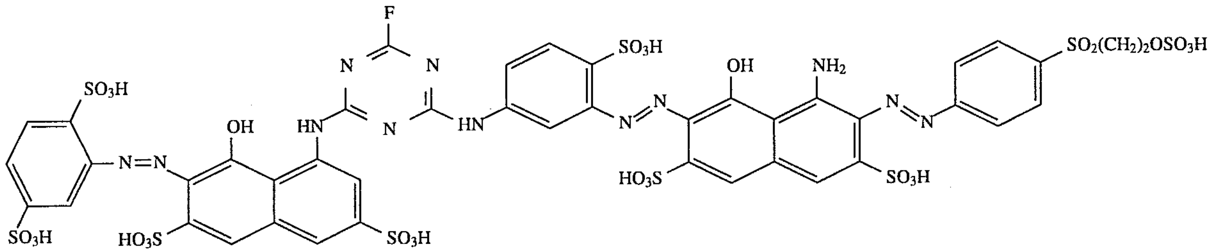 | dark blue |
| 37 | 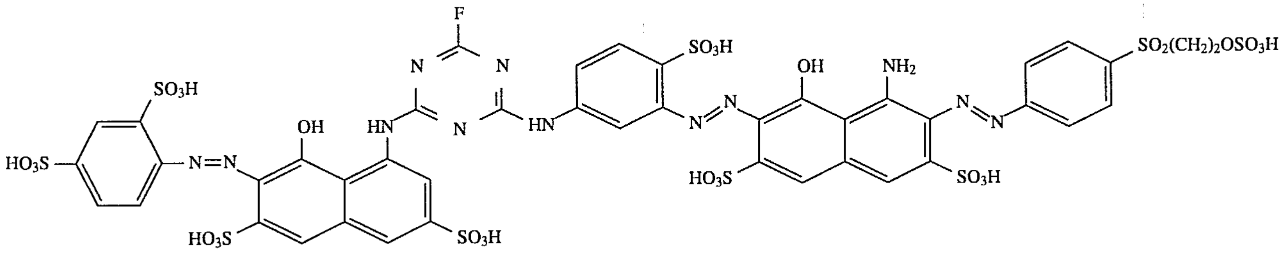 | dark blue |
| 38 | 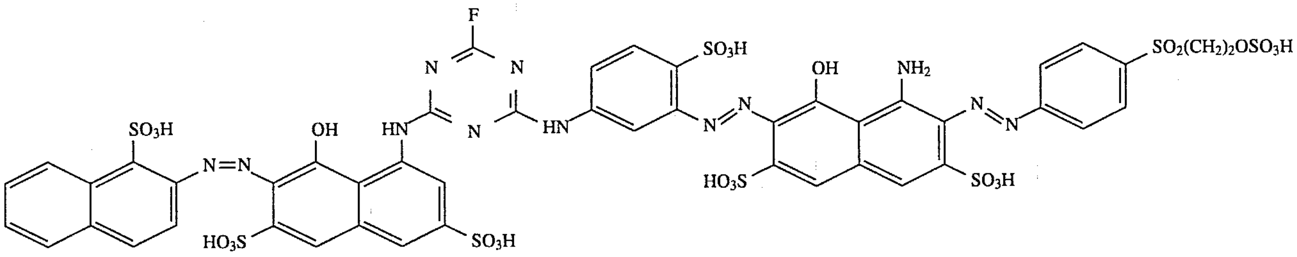 | dark blue |

-continued
| | | |
|---|---|---|
| 39 | 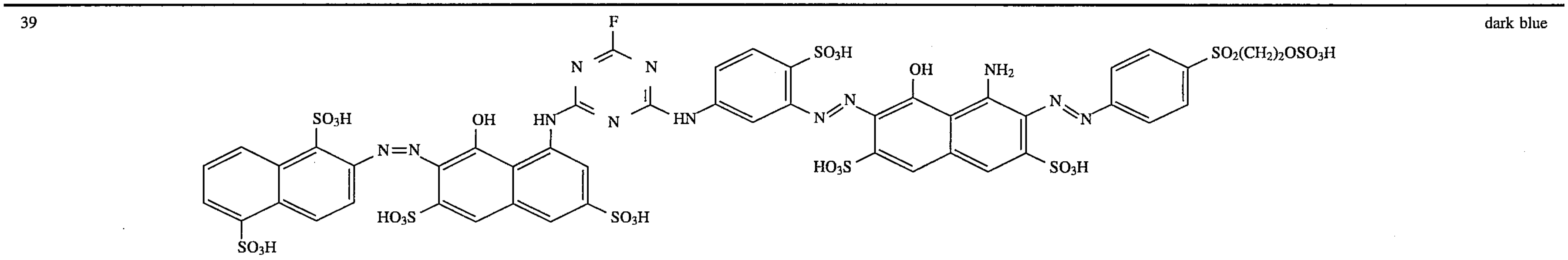 | dark blue |
| 40 | 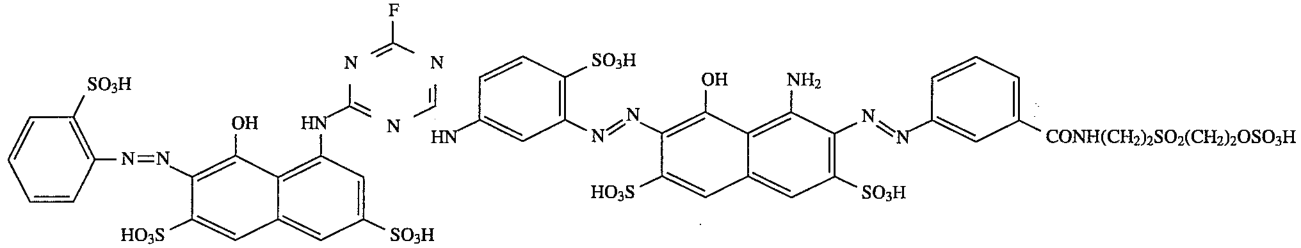 | dark blue |
| 41 | 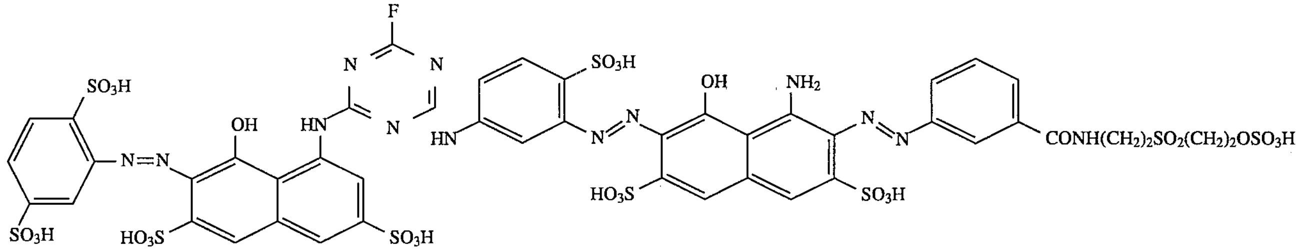 | dark blue |
| 42 | 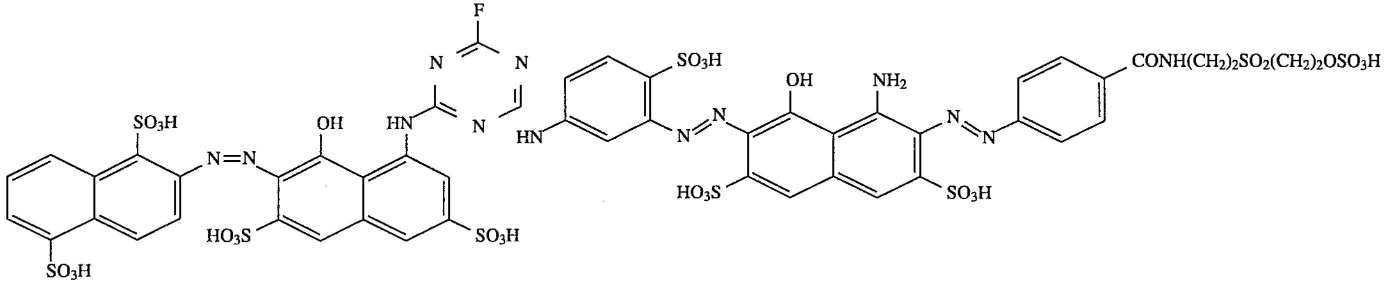 | dark blue |

-continued
| | | |
|---|---|---|
| 43 | 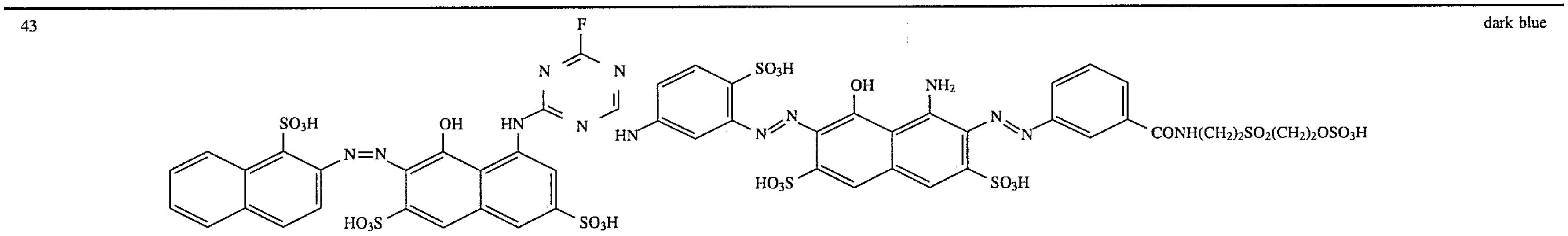 | dark blue |
| 44 | 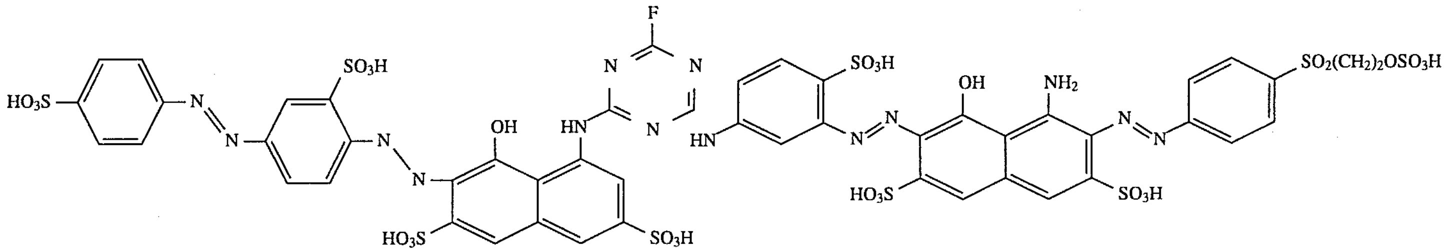 | navy |
| 45 | 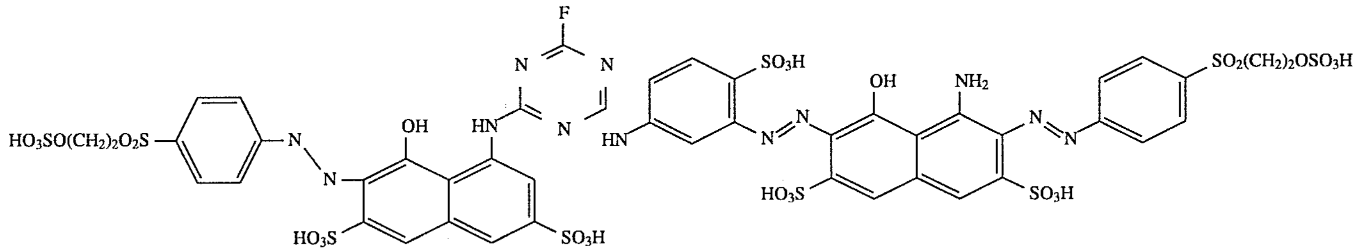 | dark blue |
| 46 | 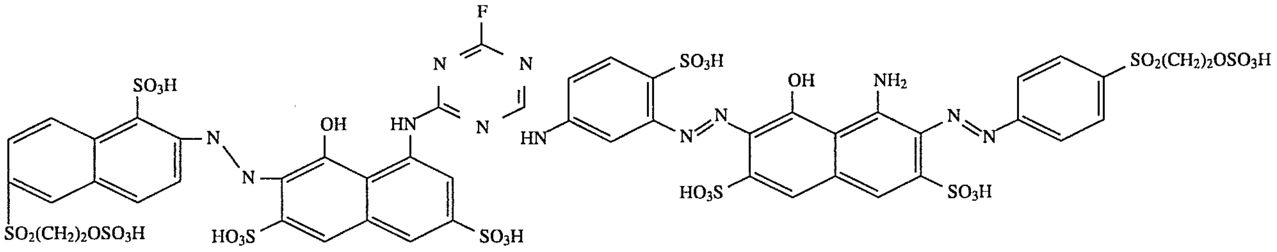 | dark blue |

-continued
| | | |
|---|---|---|
| 47 | 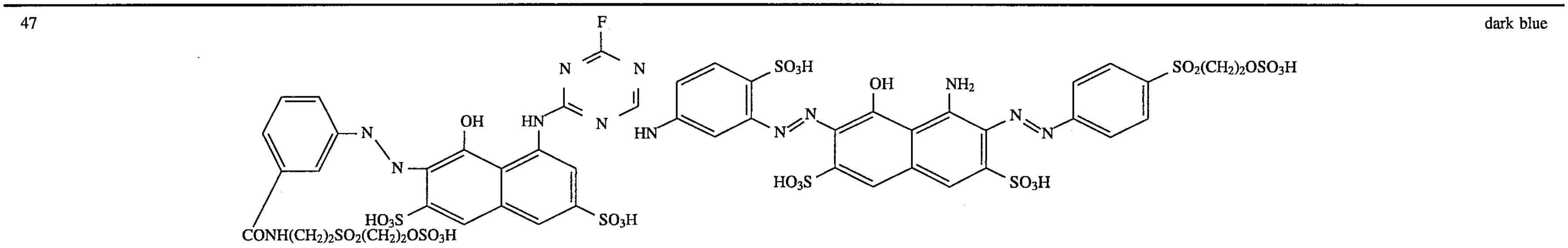 | dark blue |
| 48 | 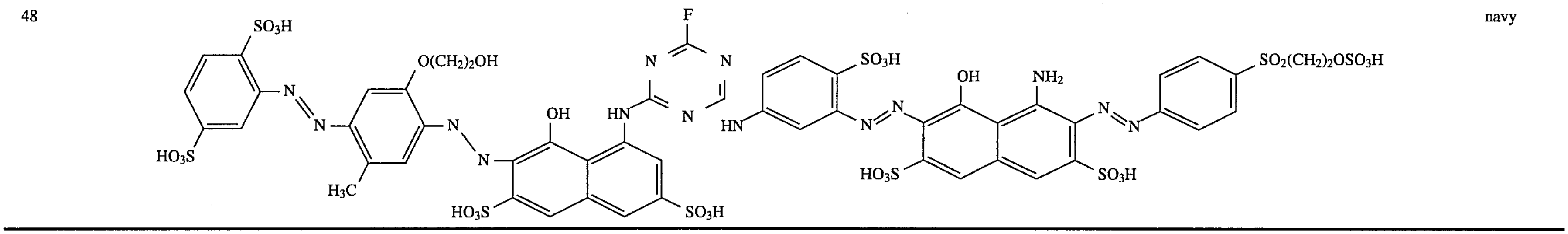 | navy |

EXAMPLE 49

Examples 19 to 48 are repeated using instead of the fluorotriazinyl-containing precursor in each case the corresponding chlorotriazinyl-containing precursor. This results in the analogous chlorotriazinyl compounds.

EXAMPLE 50

18.45 parts of cyanuric chloride are suspended in 150 parts of ice water and stirred. 38.5 parts of 1-amino-8-hydroxynaphthalene-3,6-disulfonic acid, dissolved in 180 parts of water, are added dropwise at 0° to 2° C. The resulting hydrochloric acid is neutralized by the addition of 2N sodium hydroxide solution. After the condensation has ended, 28 parts of 4-amino(2-sulfatoethylsulfonyl)benzene are diazotized in a conventional manner using sodium nitrite in hydrochloric acid and coupled at pH 2.5–6 and 0°–5° C. The resulting compound of the formula

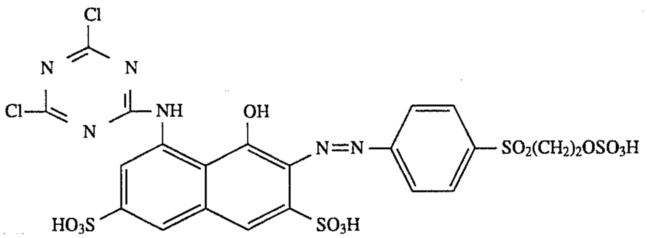

(501)

is subsequently condensed with 59.5 parts of the compound of the formula

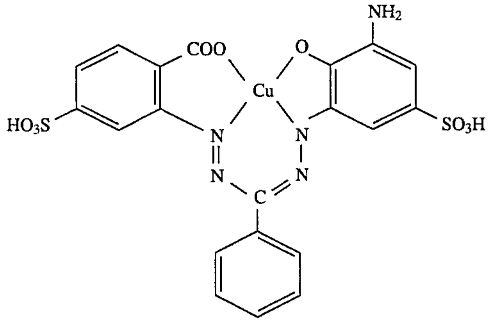

in the course of about 3 hours at pH 6–7 and room temperature. The reaction mixture is subsequently stirred for about 16 hours, and then the precipitated dye is filtered off and washed with water and acetone; the dye conforms to the formula

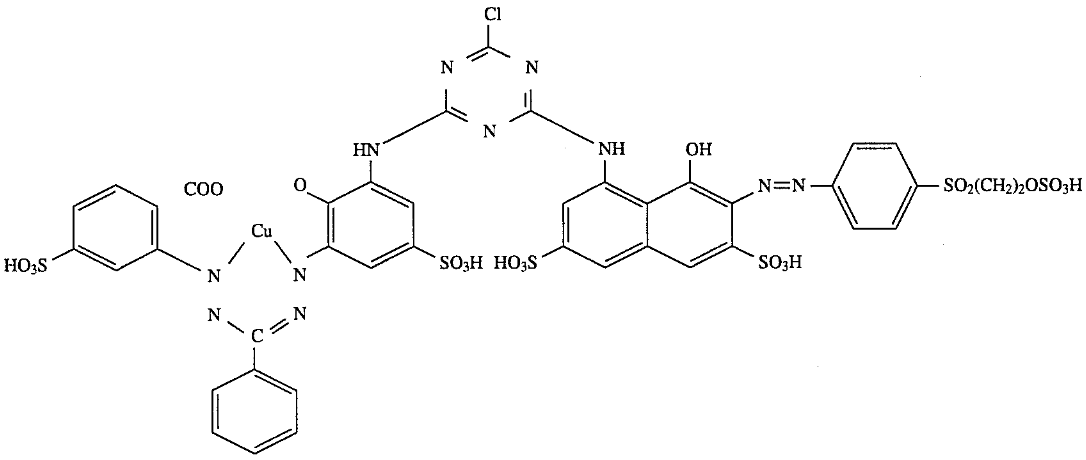

and dyes cotton in bright blue shades.

EXAMPLE 50a

Example 50 is repeated using instead of the compound of the formula (501) the analogous amount of the compound of the formula

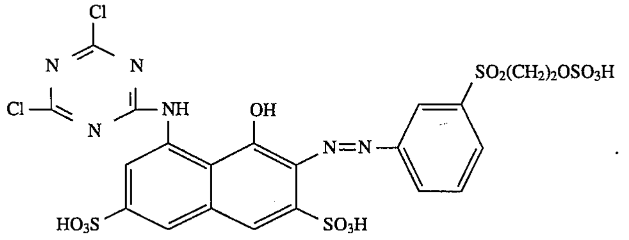

(502)

This results in the compound of the formula

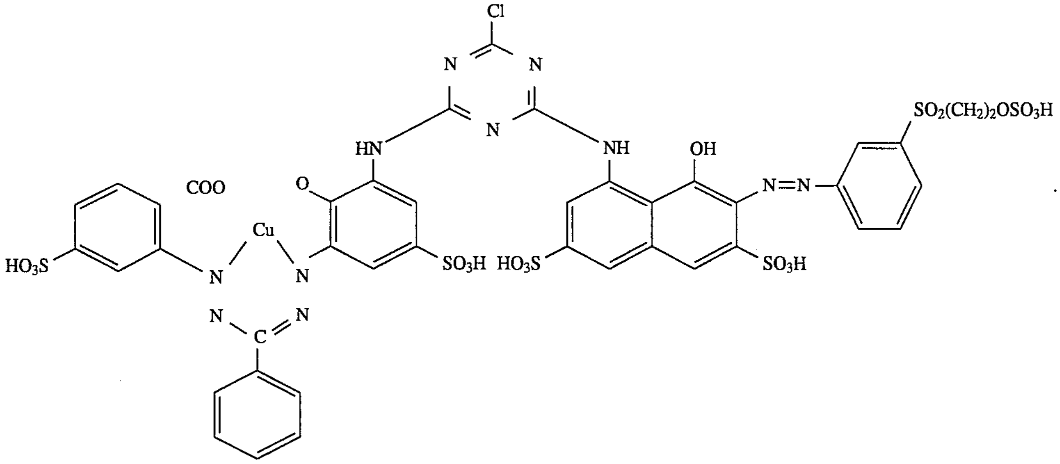

EXAMPLE 51

The product of the formula (501) prepared as described in Example 50 is condensed in the course of about 3.5 hours at 20° to 30° C. and pH 6.5 and 6.75 with 54.5 parts of the monoazo compound of the formula

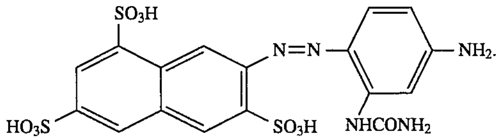

After subsequent stirring at room temperature and pH 6.5 for about 16 hours, the dye is filtered off and washed; it conforms to the formula

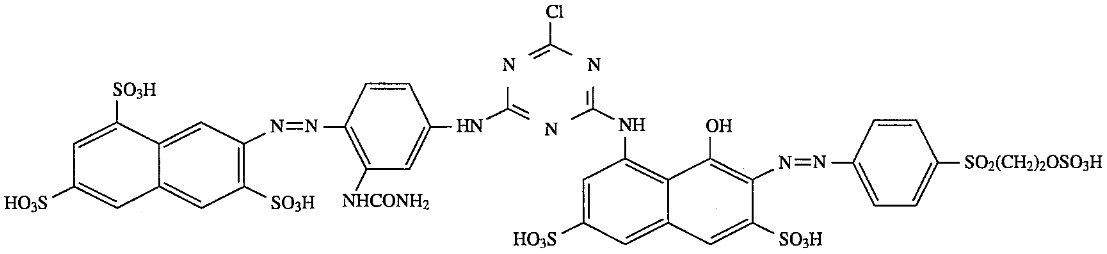

and dyes cotton in a scarlet shade with good allround fastness properties.

EXAMPLE 51a

Example 51 is repeated using instead of the compound of the formula (501) the analogous amount of the compound of the formula (502). This results in the compound of the formula

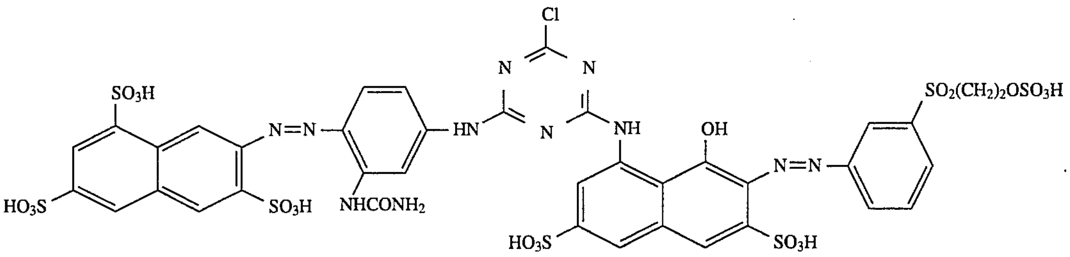
EXAMPLES 52–68
The method of example 50 or 51 can be used to prepare further dyes of the formula
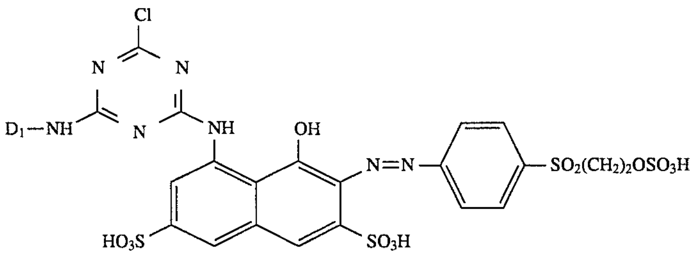
(503)
in which $D_1$ is as defined in the table:
| Ex.: | $D_1$ | Hue |
|---|---|---|
| 52 | 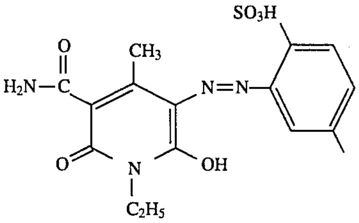 | orange |
| 53 | 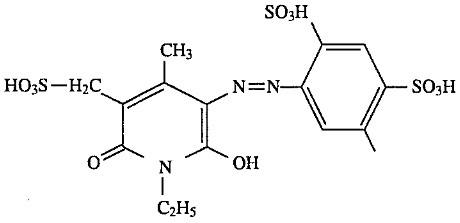 | orange |
| 54 | 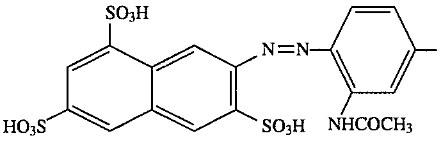 | scarlet |
| 55 | 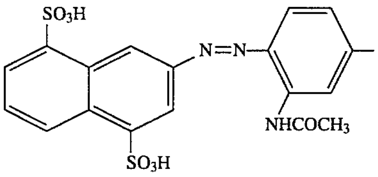 | scarlet |

-continued
| Ex.: | $D_1$ | Hue |
|---|---|---|
| 56 | 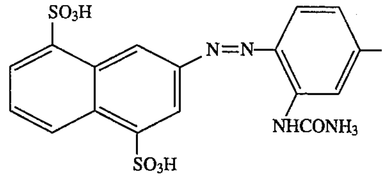 | scarlet |
| 57 | 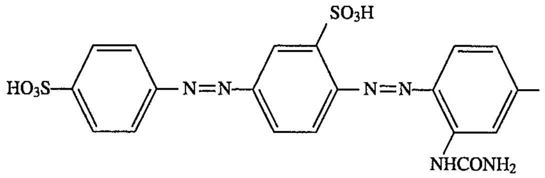 | brown |
| 58 | 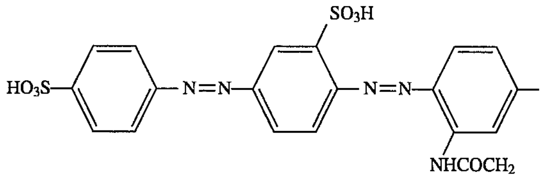 | brown |
| 59 | 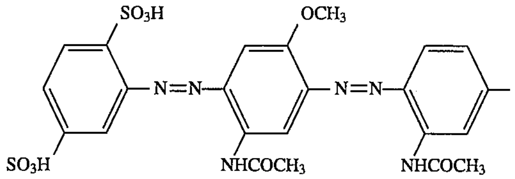 | brown |
| 60 | 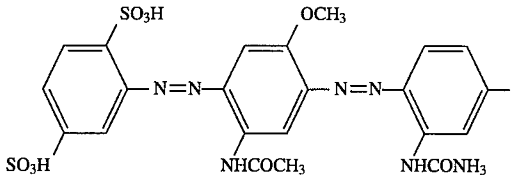 | brown |
| 61 | 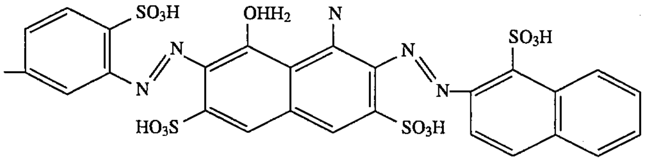 | navy |
| 62 | 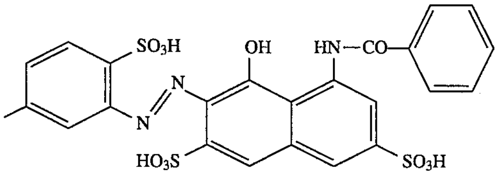 | red |
| 63 | 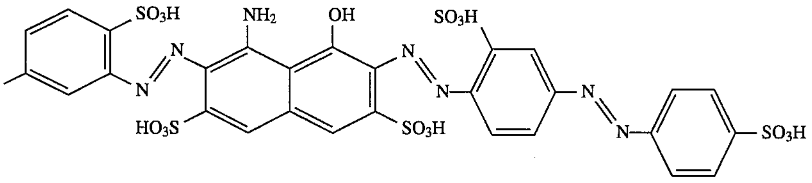 | navy |
| 64 | 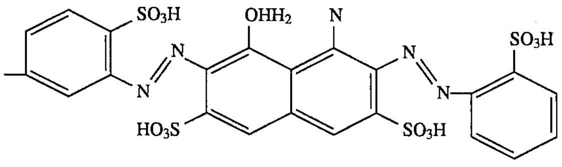 | navy |

-continued

| Ex.: | $D_1$ | Hue |
|---|---|---|
| 65 | 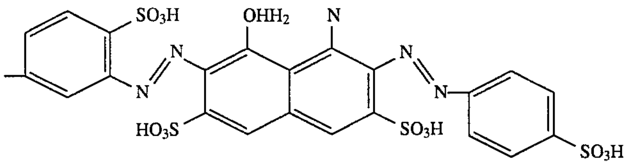 | navy |
| 66 | 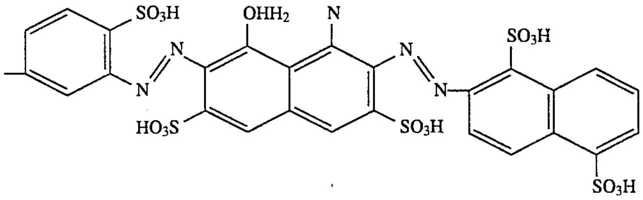 | navy |
| 67 | 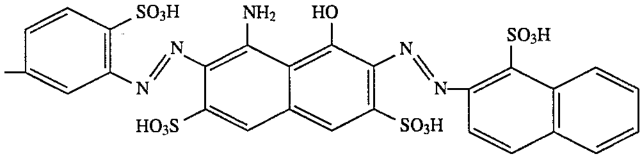 | dark blue |
| 68 | 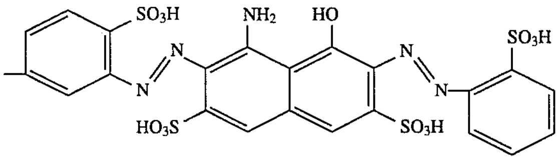 | dark blue |

EXAMPLE 69

Examples 50 to 68 are repeated using instead of the chlorotriazinyl-containing precursor of the formula (503) in each case the corresponding fluorotriazinyl-containing precursor. This results in the analogous fluorotriazinyl compounds.

EXAMPLES 70–72

The method of Example 50 or 51 can be used to prepare the dyes of the formula

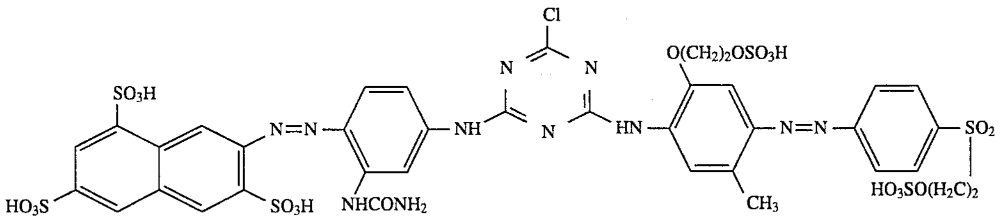

and

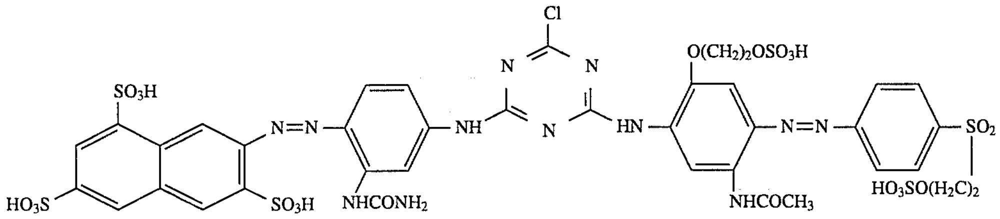

which each dye cotton in a yellow shade with good allround fastness properties.

EXAMPLES 73–78

The method of Example 50 or 51 can be used to prepare further dyes of the formula

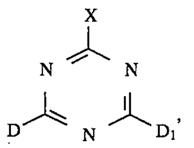

in which X, D and $D_1$ are each as defined in the table:

| Ex.: | $D_1$: | X: | D: | Y: | Hue: |
|---|---|---|---|---|---|
| 73 | A14 | Cl | A109 | $—CH{=}CH_2$ | orange |
| 74 | A14 | F | A109 | $—CH{=}CH_2$ | orange |
| 75 | A4 | Cl | A109 | $—(CH_2)_2OSO_3H$ | orange |
| 76 | A2 | Cl | A109 | $—(CH_2)_2OSO_3H$ | orange |
| 77 | A57 | F | A113 | $—(CH_2)_2OSO_3H$ | violet |
| 78 | A75 | Cl | A109 | $—(CH_2)_2OSO_3H$ | blue |

The meanings of the radicals A1 to A126 are specified in the description.

EXAMPLE 79

2 parts of the dye of Example 1 are dissolved in 400 parts of water; 1500 parts of a solution containing 53 g of sodium chloride per liter are added. This dyebath is entered at 40° C. with 100 parts of a cotton fabric. After 5 minutes 100 parts of a solution containing 16 g of sodium hydroxide and 20 g of anhydrous $Na_2CO_3$ per liter are added. The temperature of the dyebath is held at 40° C. for a further 45 minutes. Then the fabric, which has been dyed navy, is rinsed, soaped off at the boil for a quarter of an hour with a nonionic detergent, rinsed once more and dried. The dyeing obtained has very good fastness properties.

EXAMPLE 80

2 parts of the dye of Example 1 are dissolved in 400 parts of after; 1500 parts of a solution containing 53 g of sodium chloride per liter are added. This dyebath is entered at 35° C. with 100 parts of a cotton fabric. After 20 minutes 100 parts of a solution containing 16 g of sodium hydroxide and 20 g of anhydrous $Na_2CO_3$ per liter are added. The temperature of the dyebath is held at 35° C. for a further 15 minutes. The temperature is then raised over 20 minutes to 60° C. The temperature is held at 60° C. for a further 35 minutes. Thereafter the fabric, which has been dyed navy, is rinsed, soaped off at the boil for a quarter of an hour with a nonionic detergent, rinsed once more and dried. The dyeing obtained has very good fastness properties.

EXAMPLE 81

8 parts of the dye of Example 1 are dissolved in 400 parts of water; 1400 parts of a solution containing 100 g of sodium sulfate per liter are added. This dyebath is entered at 25° C. with 100 parts of a cotton fabric. After 10 minutes 200 parts of a solution containing 150 g of trisodium phosphate per liter are added. Then the temperature of the dyebath is raised to 60° C. over 10 minutes. The temperature is held at 60° C. for a further 90 minutes. Thereafter the fabric, which has been dyed navy, is rinsed, soaped off at the boil for a quarter of an hour with a nonionic detergent, rinsed once more and dried. The dyeing obtained has very good fastness properties.

EXAMPLE 82

4 parts of the dye of Example 1 are dissolved in 50 parts of water. 50 parts of a solution containing 5 g of sodium hydroxide and 20 g of anhydrous $Na_2CO_3$ per liter are added. The solution obtained is used for padding a cotton fabric to a wet pick-up of 70% of its weight and the fabric is then wound onto a batching roller. It is stored in that state at room temperature for 3 hours. Thereafter the fabric, which has been dyed navy, is rinsed, soaped off at the boil for a quarter of an hour with a nonionic detergent, rinsed once more and dried. The dyeing obtained has very good fastness properties.

EXAMPLE 83

6 parts of the dye of Example 1 are dissolved in 50 parts of water. 50 parts of a solution containing 16 g of sodium hydroxide and 0.041 of 38° Bé waterflass are added. The solution obtained is used for padding a cotton fabric to a wet pick-up of 70% of its weight and the fabric is then wound onto a batching roller. It is stored in that state at room temperature for 10 hours. Thereafter the fabric, which has been dyed navy, is rinsed, soaped off at the boil for a quarter of an hour with a nonionic detergent, rinsed once more and dried. The dyeing obtained has very good fastness properties.

EXAMPLE 84

2 parts of the dye of Example 1 are dissolved in 100 parts of water with 0.5 parts of sodium m-nitrobenzenesulfonate. The solution obtained is used for impregnating a cotton fabric to a wet pick-up of 75% of its weight and the fabric is then dried. The fabric is then impregnated with a 20° C. solution containing 4 g of sodium hydroxide and 300 g of sodium chloride per liter, squeezed off to a weight increase of 75%, the navy dyeing is steamed at 100°–102° C. for 30 seconds, rinsed, soaped off at the boil for a quarter of an hour in a 0.3% solution of a nonionic detergent, rinsed and dried. The dyeing obtained has very good fastness properties.

EXAMPLE 85

3 parts of the dye of Example 1 are sprinkled with rapid stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium bicarbonate. The resulting print past is used for printing a cotton fabric, which is then dried and steamed at 102° C. in saturated steam for 2 minutes. The fabric bearing the navy print is then rinsed, if desired soaped off at the boil and rinsed once more, and subsequently dried. The print obtained has very good fastness properties.

EXAMPLE 86

5 parts of the dye of Example 1 are sprinkled with rapid stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium bicarbonate. The resulting print past, the stability of which corresponds to the industrial requirements, is used for printing a cotton fabric, which is then dried and steamed at 102° C. in saturated steam for 8 minutes. The fabric bearing the navy print is then rinsed, if desired soaped off at the boil and rinsed once more, and subsequently dried. The print obtained has very good fastness properties.

What is claimed is:

1. A compound of the formula

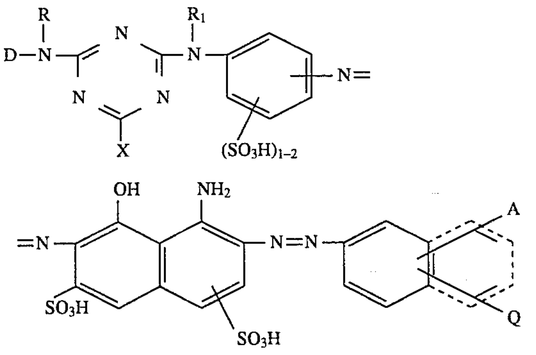

(1a)

where

D is the radical of a monoazo, polyazo, metal complex azo, anthraquinone, triphendioxazine, phthalocyanine or formazan chromophore that contains at least one sulfo group, A is hydrogen, halogen, $C_1$–$C_4$alkyl, $C_1$–$C_4$alkoxy, sulfo, carboxyl, trifluoromethyl, nitro, cyano, hydroxyl, carbamoyl, N-mono- or N,N-di-$C_1$–$C_4$alkylcarbamoyl, sulfamoyl, N-mono- or N,N-di-$C_1$–$C_4$alkylsulfamoyl, $C_1$–$C_4$alkylsulfonyl or $C_1$–$C_4$alkoxycarbonyl, Q is a radical of the formula $$-SO_2-Y \qquad (2a)$$

$$-CONH-(CH_2)_n-SO_2-Y \qquad (2b)$$

$$-CONH-(CH_2)_{n'}-O-(CH_2)_n-SO_2-Y \qquad (2c)$$

or $$-(O)_p-(CH_2)_m-CONH-(CH_2)_n-SO_2-Y, \qquad (2d)$$

where n,n' and m are each independently of the others an integer from 1 to 6, p is 0 or 1, and Y is vinyl, β-bromoethyl, β-chloroethyl, β-acetoxyethyl, β-phenoxyethyl, β-phosphatoethyl, β-sulfatoethyl or β-thiosulfatoethyl, X is fluorine, chlorine, bromine, 3-carboxy-1-pyridinyl or 3-carbamoyl-1-pyridinyl, and R and $R_1$ are each independently of the other hydrogen or unsubstituted or halogen-, hydroxyl-, cyano-, $C_1$–$C_4$alkoxy-, $C_1$–$C_4$alkoxycarbonyl-, carboxyl-, sulfo- or sulfato-substituted $C_1$–$C_4$ alkyl, with the proviso that the radical —NR— is not bonded to an $NH_2$-substituted phenylene radical when D is the radical of a monoazo or disazo chromophore.

2. A compound of the formula

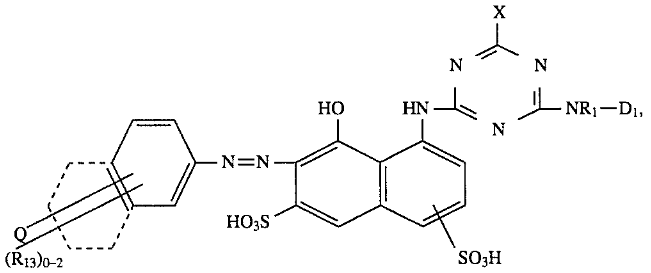

(1b)

where $D_1$ is the radical of a monoazo chromophore of the formula

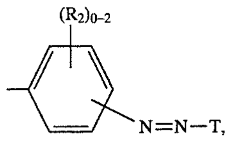

(1*)

where $(R_2)_{0-2}$ represents 0 to 2 identical or different radicals $R_2$ selected from the group consisting of sulfo, sulfomethyl, hydroxyl, carboxyl, halogen, cyano, trifluoromethyl, sulfamoyl, carbamoyl, $C_2$–$C_4$alkanoylamino, ureido, $C_1$–$C_4$alkyl, $C_1$–$C_4$alkoxy, or $C_1$–$C_4$alkoxy substituted by $C_1$–$C_4$alkoxy, hydroxyl or sulfato in the alkyl moiety, and T is the radical of a diazo component or coupling component of the benzene or naphthalene series or of the heterocyclic series, or is the radical of a polyazo, metal complex azo, anthraquinone, triphendioxazine, phthalocyanine or formazan chromophore, X is fluorine, chlorine, bromine, 3-carboxy-1-pyridinyl or 3-carbamoyl-1-pyridinyl, $R_1$ is hydrogen or unsubstituted or halogen-, hydroxyl-, cyano-, $C_1$–$C_4$alkoxy-, $C_1$–$C_4$alkoxycarbonyl-, carboxyl-, sulfo- or sulfato-substituted $C_1$–$C_4$alkyl, $(R_{13})_{0-2}$ represents 0 to 2 identical or different radicals selected from the group consisting of methyl, methoxy, chlorine and sulfo and Q is a radical of the formula $$-SO_2-Y \qquad (2a)$$

$$-CONH-(CH_2)_n-SO_2-Y \qquad (2b)$$

$$-CONH-(CH_2)_{n'}-O-(CH_2)_n-SO_2-Y \qquad (2c)$$

or $$-(O)_p-(CH_2)_m-CONH-(CH_2)_n-SO_2-Y, \qquad (2d)$$

where n,n' and m are each independently of the others an integer from 1 to 6, p is 0 or 1, and Y is vinyl, β-bromoethyl, β-chloroethyl, β-acetoxyethyl, β-phenoxyethyl, β-phosphatoethyl, β-sulfatoethyl or β-thiosulfatoethyl.

3. A compound according to claim 1, wherein R and $R_1$ are each independently of the other methyl, ethyl or in particular hydrogen.

4. A compound according to claim 1, wherein X is chlorine or fluorine.

5. A compound according to claim 2, wherein $D_1$ is a radical of the formula (1*) where $(R_2)_{0-2}$ represents 0 to 2 identical or different radicals selected from the group consisting of sulfo, acetylamino, propionylamino, ureido, methyl, methoxy, 2-hydroxyethoxy and 2-sulfatoethoxy and T is a phenyl or naphthyl radical which is unsubstituted or substituted by sulfo, methyl, methoxy, chlorine or a radical of the formula $$-SO_2-Y \quad (2a)$$

or $$-CONH-(CH_2)_{2-3}-SO_2-Y, \quad (2b")$$

where Y is vinyl or β-sulfatoethyl, as radical of a diazo component.

6. A compound according to claim 2, wherein $D_1$ is a radical of the formula (1*) where $(R_2)_{0-2}$ represents 0 to 2 identical or different radicals selected from the group consisting of sulfo, acetylamino, propionylamino, ureido, methyl, methoxy, 2-hydroxyethoxy and 2-sulfatoethoxy and T is unsubstituted or $C_1$–$C_2$alkyl-, $C_1$–$C_2$alkoxy-, halogen-, carboxyl-, sulfo-, hydroxyl-, amino-, N-mono-$C_1$–$C_4$alkylamino-, N,N-di-$C_1$–$C_4$alkylamino-, $C_2$–$C_4$alkanoylamino- or benzoylamino-substituted phenyl or naphthyl or a radical of the formula

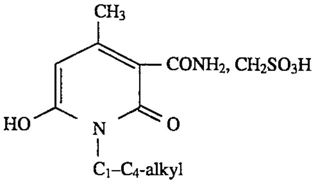
(3)

or

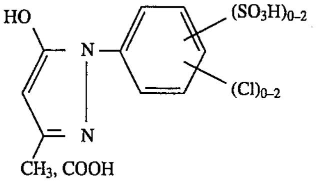
(3')

as radical of a coupling component.

7. A compound according to claim 1, wherein D is a) a radical of the formula

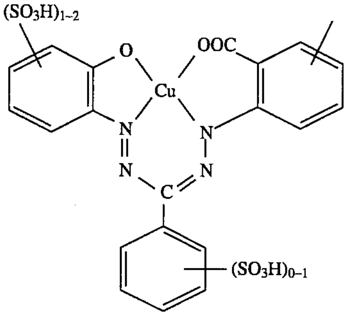
(5a)

-continued or

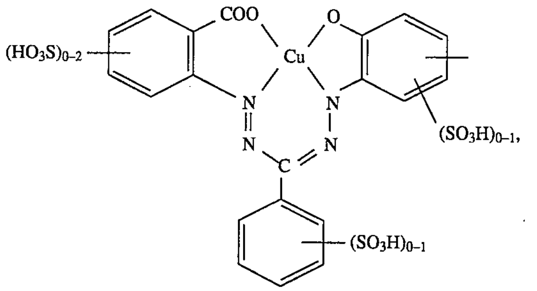
(5b)

where the benzene nuclei are unsubstituted or substituted by alkyl having 1 to 4 carbon atoms, alkoxy having 1 to 4 carbon atoms, alkylsulfonyl having 1 to 4 carbon atoms, halogen, carboxyl or a fibre-reactive radical of the formula $$-SO_2-Y \quad (2a)$$

$$-CONH-(CH_2)_n-SO_2-Y \quad (2b)$$

$$-CONH-(CH_2)_{n'}-O-(CH_2)_n-SO_2-Y \quad (2c)$$

or $$-(O)_p-(CH_2)_m-CONH-(CH_2)_n-SO_2-Y, \quad (2d)$$

where n, n' and m are each independently of the others an integer from 1 to 6, p is 0 or 1, and Y is vinyl, β-bromoethyl, β-chloroethyl, β-=acetoxyethyl, β-phenoxyethyl, β-phosphatoethyl, β-sulfatoethyl or β-thiosulfatoethyl, b) a radical of the formula

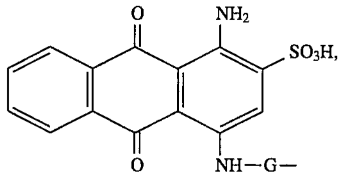
(6)

where G is a phenylene, cyclohexylene, phenylenemethylene or $C_2$–$C_6$alkylene radical, and the anthraquinone nucleus is unsubstituted or substituted by a further sulfo group, and G as phenyl radical is unsubstituted or substituted by alkyl having 1 to 4 carbon atoms, alkoxy having 1 to 4 carbon atoms, halogen, carboxyl or sulfo, or c) a radical of the formula

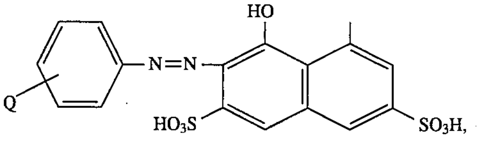
(21a)

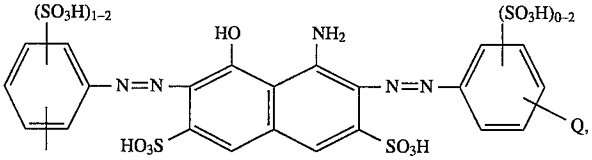
(22a)

-continued

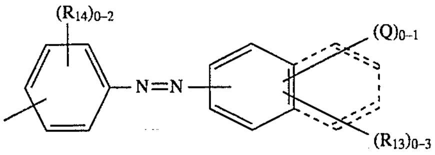

(23)

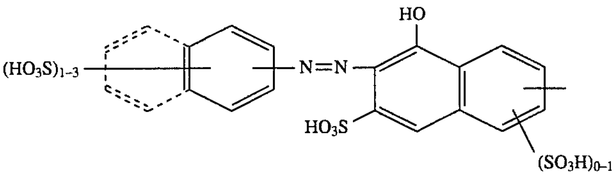

(24)

or

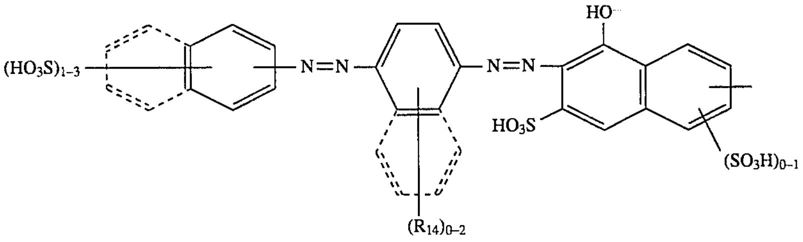

(25)

where $(R_{13})_{0-3}$ represents 0 to 3 identical or different radicals $R_{13}$ selected from the group consisting of methyl, methoxy, chlorine and sulfo, $(R_{14})_{0-2}$ represents 0 to 2 identical or different radicals $R_{14}$ selected from the group consisting of sulfo, acetylamino, propionylamino, ureido, methyl, methoxy, 2-hydroxyethoxy and 2-sulfatoethoxy, and Q is a radical of the formula $$-SO_2-Y \quad (2a)$$

or $$-CONH-(CH_2)_{2-3}-SO_2-Y, \quad (2b'')$$

where Y is vinyl or β-sulfatoethyl.

8. A compound according to claim 1, wherein $D_1$ is a) a radical of the formula

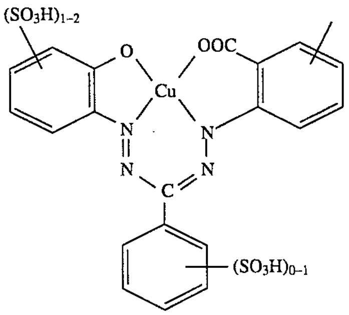

(5a)

or

-continued

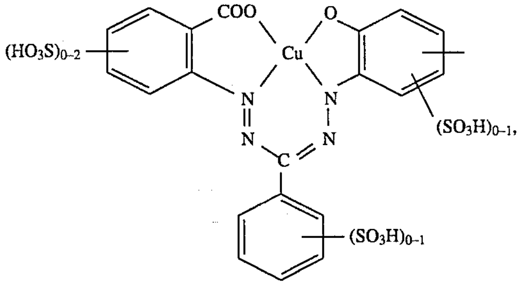

(5b)

where the benzene nuclei are unsubstituted or substituted by alkyl having 1 to 4 carbon atoms, alkoxy having 1 to 4 carbon atoms, alkylsulfonyl having 1 to 4 carbon atoms, halogen, carboxyl or a fibre-reactive radical of the formula $$-SO_2-Y \quad (2a)$$

$$-CONH-(CH_2)_n-SO_2-Y \quad (2b)$$

$$-CONH-(CH_2)_{n'}-O-(CH_2)_n-SO_2-Y \quad (2c)$$

or $$-(O)_p-(CH_2)_m-CONH-(CH_2)_n-SO_2-Y, \quad (2d)$$

where n,n' and m are each independently of the others an integer from 1 to 6, p is 0 or 1, and Y is vinyl, β-bromoethyl, β-chloroethyl, β-acetoxyethyl, β-phenoxyethyl, β-phosphatoethyl, β-sulfatoethyl or β-thiosulfatoethyl, b) a radical of the formula

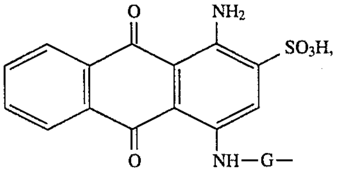

(6)

where G is a phenylene, cyclohexylene, phenylenemethylene or $C_2$–$C_6$alkylene radical, and the anthraquinone nucleus is unsubstituted or substituted by a further sulfo group, and G as phenyl radical is unsubstituted or substituted by alkyl having 1 to 4 carbon atoms, alkoxy having 1 to 4 carbon atoms, halogen, carboxyl or sulfo, c) a radical of the formula

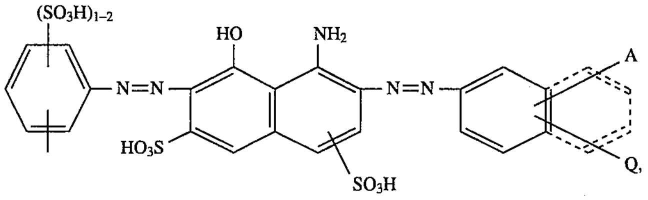

(22)

where A is hydrogen, halogen, $C_1$–$C_4$alkyl, $C_1$–$C_4$alkoxy, sulfo, carboxyl, trifluoromethyl, nitro, cyano, hydroxyl, carbamoyl, N-mono- or N,N-di-$C_1$–$C_4$alkylcarbamoyl, sulfamoyl, N-mono- or N,N,-di-$C_1$–$C_4$alkylsulfamoyl, $C_1$–$C_4$alkylsulfonyl or $C_1$–$C_4$alkoxycarbonyl and Q is a radical of the formula (2a), (2b), (2c) or (2d) indicated above, or d) a radical of the formula

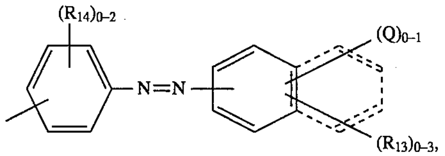

(23)

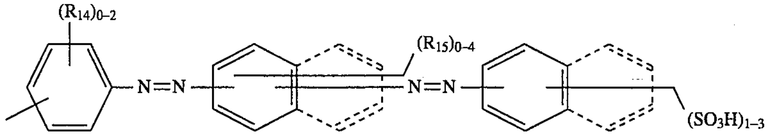

(26)

or

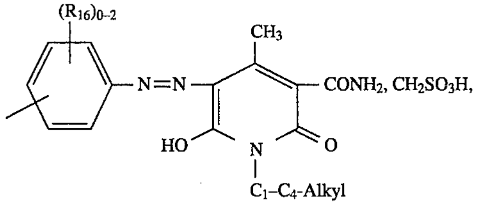

(27)

where $(R_{13})_{0\text{-}3}$ represents 0 to 3 identical or different radicals $R_{13}$ selected from the group consisting of methyl, methoxy, chlorine and sulfo, $(R_{14})_{0\text{-}2}$ represents 0 to 2 identical or different radicals $R_{14}$ selected from the group consisting of sulfo, acetylamino, propionylamino, ureido, methyl, methoxy, 2-hydroxyethoxy and 2-sulfatoethoxy, $(R_{15})_{0\text{-}4}$ represents 0 to 4 identical or different radicals $R_{15}$ selected from the group consisting of sulfo, hydroxyl, amino, methoxy, 2-hydroxyethoxy, 2-sulfatoethoxy, methyl, acetylamino, benzoylamino, propionylamino and ureido, $(R_{16})_{0\text{-}2}$ represents 0 to 2 identical or different radicals $R_{16}$ selected from the group consisting of sulfo, methyl, methoxy and chlorine, and Q is a radical of the formula (2a), (2b), (2c) or (2d) indicated above.

9. A compound according to claim 1 of the formula

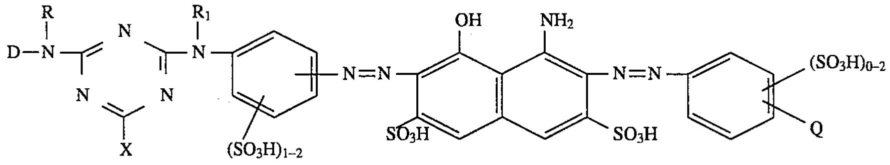

(1a')

where R and $R_1$ are each independently of the other hydrogen, methyl or ethyl, X is chlorine or fluorine, Q is a radical of the formula $$-SO_2-Y \quad (2a)$$

or $$-CONH-(CH_2)_{2\text{-}3}-SO_2-Y, \quad (2b'')$$

where Y is vinyl or β-sulfatoethyl, and D is a radical of the formula

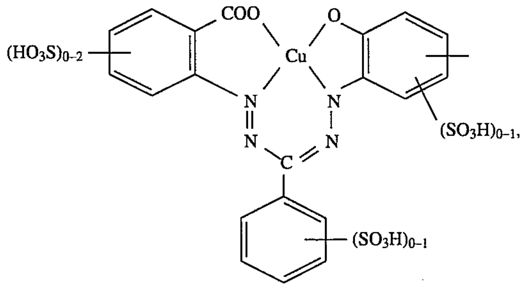

(5b)

or is a radical of the formula

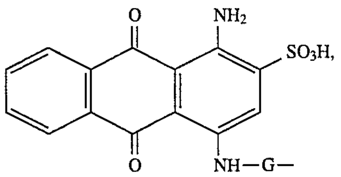

(6)

where G is a phenylene, cyclohexylene, phenylenemethylene or $C_2$–$C_6$alkylene radical, and the anthraquinone nucleus is unsubstituted or substituted by a further sulfo group, and G as phenyl radical is unsubstituted or substituted by alkyl having 1 to 4 carbon atoms, alkoxy having 1 to 4 carbon atoms, halogen, carboxyl or sulfo, or is a radical of the formula wherein $R_1$ is hydrogen, methyl or ethyl, X is chlorine or fluorine, Q is a radical of the formula $$-SO_2-Y \quad (2a)$$

or $$-CONH-(CH_2)_{2\text{-}3}-SO_2-Y, \quad (2b'')$$

where Y is vinyl or β-sulfatoethyl, and $D_1$ is a radical of the formula

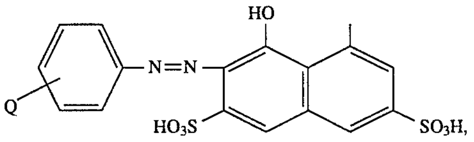

(21a)

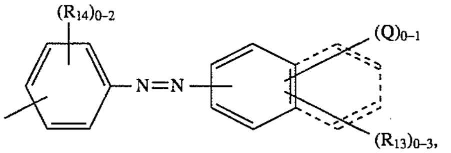

(23)

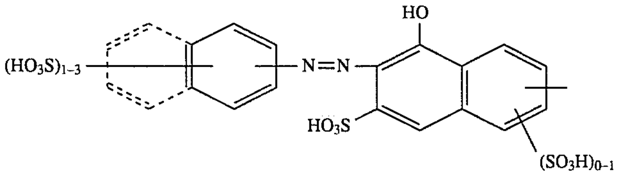

(24)

or

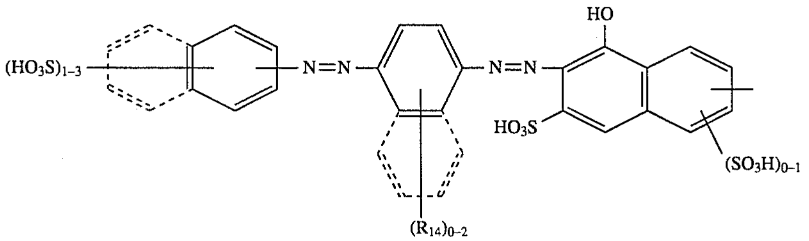

(25)

$(R_{13})_{0\text{-}3}$ represents 0 to 3 identical or different radicals $R_{13}$ selected from the group consisting of methyl, methoxy, chlorine and sulfo, $(R_{14})_{0\text{-}2}$ represents 0 to 2 identical or different radicals $R_{14}$ selected from the group consisting of sulfo, acetylamino, propionylamino, ureido, methyl, methoxy, 2-hydroxyethoxy and 2-sulfatoethoxy, and Q is a radical of the formula (2a) or (2b") indicated above.

10. A compound according to claim 2 of the formula

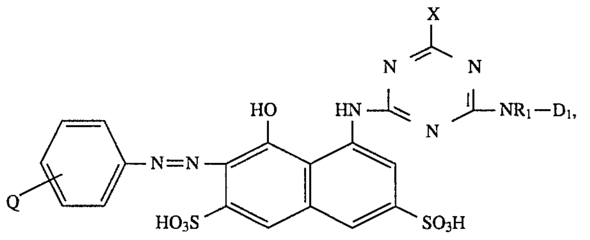

(1b')

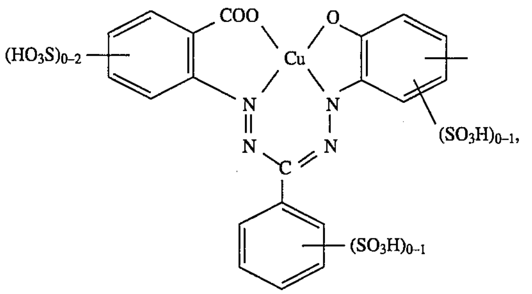

(5b)

or is a radical of the of formula

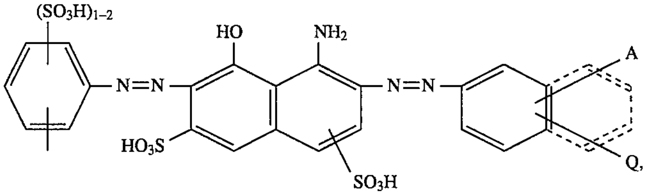

(22)

where A is hydrogen, halogen, $C_1$–$C_4$alkyl, $C_1$–$C_4$alkoxy, sulfo, carboxyl, trifluoromethyl, nitro, cyano, hydroxyl, carbamoyl, N-mono- or N,N-di-$C_1$–$C_4$alkylcarbamoyl, sulfamoyl, N-mono- or N,N,-di-$C_1$–$C_4$alkylsulfamoyl, $C_1$–$C_4$alkylsulfonyl or $C_1$–$C_4$alkoxycarbonyl and Q is a radical of the formula (2a) or (2b") indicated above, or is a radical of the formula

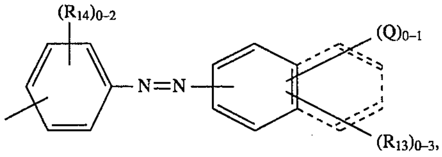

(23)

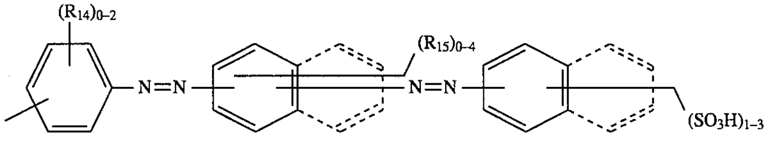

(26)

or

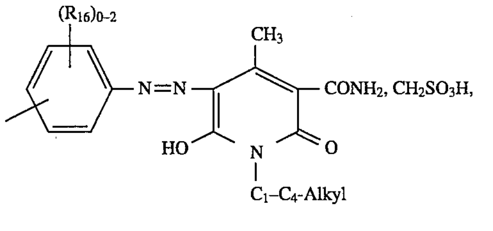

(27)

$(R_{13})_{0-3}$ represents 0 to 3 identical or different radicals $R_{13}$ selected from the group consisting of methyl, methoxy, chlorine and sulfo, $(R_{14})_{0-2}$ represents 0 to 2 identical or different radicals $R_{14}$ selected from the group consisting of sulfo, acetylamino, propionylamino, ureido, methyl, methoxy, 2-hydroxyethoxy and 2-sulfatoethoxy, $(R_{15})_{0-4}$ represents 0 to 4 identical or different radicals $R_{15}$ selected from the group consisting of sulfo, hydroxyl, amino, methoxy, 2-hydroxyethoxy, 2-sulfatoethoxy, methyl, acetylamino, benzoylamino, propionylamino and ureido, $(R_{16})_{0-2}$ represents 0 to 2 identical or different radicals $R_{16}$ selected from the group consisting of sulfo, methyl, methoxy and chlorine, and Q is a radical of the formula (2a) or (2b") indicated above.

11. A compound according to claim 2, wherein $R_1$ is methyl, ethyl or hydrogen.

12. A compound according to claim 2, wherein X is chlorine or fluorine.

13. A compound according to claim 10 of the formula (1b'), where $D_1$ is a radical of the formula (5b).

14. A process for dyeing and printing a cellulose-containing fibre material, which comprises treating the fibre material in an aqueous solution with a tinctorially effective amount of a dye of the formula (1a) according to claim 1.

15. A process according to claim 14, wherein the cellulose-containing fibre materials is cotton.

16. A process for dyeing and printing a cellulose-containing fibre material, which comprises treating the fibre material in an aqueous solution with a tinctorially effective amount of a dye of the formula (1b) according to claim 2.

17. A process according to claim 16, wherein the cellulose-containing fibre material is cotton.

* * * * *